United States Patent
Zhu et al.

(10) Patent No.: US 12,452,339 B2
(45) Date of Patent: Oct. 21, 2025

(54) DATA PROCESSING METHOD AND SYSTEM, RELATED DEVICE, STORAGE MEDIUM, AND PRODUCT FOR AN EDGE SERVER IN CLOUD COMPUTING SYSTEM

(71) Applicant: Tencent Technology (Shenzhen) Company Limited, Shenzhen (CN)

(72) Inventors: Haihua Zhu, Shenzhen (CN); Dan Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 246 days.

(21) Appl. No.: 18/200,437

(22) Filed: May 22, 2023

(65) Prior Publication Data
US 2023/0300203 A1 Sep. 21, 2023

Related U.S. Application Data

(63) Continuation of application No. PCT/CN2022/117512, filed on Sep. 7, 2022.

(30) Foreign Application Priority Data

Nov. 2, 2021 (CN) .......................... 202111286046.0

(51) Int. Cl.
*G06F 15/16* (2006.01)
*H04L 67/141* (2022.01)
*H04L 67/56* (2022.01)

(52) U.S. Cl.
CPC ............ *H04L 67/141* (2013.01); *H04L 67/56* (2022.05)

(58) Field of Classification Search
CPC ....... H04L 67/56; H04L 67/141; H04L 67/10; H04L 67/289; H04L 67/564; H04L 69/14
See application file for complete search history.

(56) References Cited

U.S. PATENT DOCUMENTS

2016/0241633 A1* 8/2016 Overby, Jr. ............. H04L 67/02
2017/0230451 A1* 8/2017 Paramasivam ... G06F 16/24573
(Continued)

FOREIGN PATENT DOCUMENTS

CN 104780164 A 7/2015
CN 105681423 A 6/2016
(Continued)

OTHER PUBLICATIONS

Tencent Technology, WO, PCT/CN2022/117512, Nov. 16, 2022, 5 pgs.
(Continued)

*Primary Examiner* — Razu A Miah
(74) *Attorney, Agent, or Firm* — Morgan, Lewis & Bockius LLP

(57) ABSTRACT

The embodiments of this application disclose a data processing method performed by an edge server physically closest to a client of a target cloud application. After acquiring running data of the target cloud application from the client, the edge server determines a type of the running data. When the running data is first-type data, the edge server transmits the running data to the central cluster via a first communication channel between the edge server and the central cluster, the first communication channel being a channel matching a real-time requirement of the first-type data. But when the running data is second-type data, the edge server transmits the running data to the central cluster via a second communication channel, so that the central cluster responds to the second-type data with a service matching the second-type data.

14 Claims, 8 Drawing Sheets

(56) References Cited

U.S. PATENT DOCUMENTS

| | | | | |
|---|---|---|---|---|
| 2020/0014633 A1* | 1/2020 | You | .................. | H04W 76/10 |
| 2020/0346109 A1* | 11/2020 | Kavallierou | ............ | A63F 13/48 |
| 2021/0105194 A1* | 4/2021 | Toy | .................. | H04L 41/5096 |
| 2021/0352134 A1* | 11/2021 | Bjontegard | ......... | H04W 12/009 |
| 2022/0327007 A1* | 10/2022 | Adogla | ............... | A61K 39/395 |
| 2023/0049501 A1* | 2/2023 | Xu | .................. | H04L 67/289 |
| 2023/0300203 A1* | 9/2023 | Zhu | .................. | H04L 67/56 |
| | | | | 709/227 |

FOREIGN PATENT DOCUMENTS

| | | | |
|---|---|---|---|
| CN | 110557419 | A | 12/2019 |
| CN | 111882626 | A | 11/2020 |
| CN | 112448858 | A | 3/2021 |
| CN | 113018851 | A | 6/2021 |
| CN | 113018871 | A | 6/2021 |
| CN | 113018851 | B | 8/2021 |
| CN | 113722077 | A | 11/2021 |

OTHER PUBLICATIONS

Tencent Technology, IPRP, PCT/CN2022/117512, May 2, 2024, 6 pgs.
Tencent Technology, Extended European Search Report, EP Patent Application No. 2288983.8, Nov. 22, 2024, 8 pgs.
Tencent Technology, Isr, PCT/CN2022/117512, Nov. 16, 2022, 3 pgs.

* cited by examiner

DATA PROCESSING METHOD AND SYSTEM, RELATED DEVICE, STORAGE MEDIUM, AND PRODUCT FOR AN EDGE SERVER IN CLOUD COMPUTING SYSTEM

CROSS-REFERENCE TO RELATED APPLICATIONS

This application is a continuation application of PCT Patent Application No. PCT/CN2022/117512, entitled "DATA PROCESSING METHOD AND SYSTEM, RELATED DEVICE, STORAGE MEDIUM, AND PRODUCT" filed on Nov. 9, 2022, which claims priority to Chinese Patent Application No. 202111286046.0, entitled "DATA PROCESSING METHOD AND SYSTEM, RELATED DEVICE, STORAGE MEDIUM, AND PRODUCT" filed on Nov. 2, 2021, all of which is incorporated herein by reference in its entirety.

FIELD OF THE TECHNOLOGY

This application relates to the field of computer technologies, in particular to a data processing method and system, a related device, a storage medium, and a product.

BACKGROUND OF THE DISCLOSURE

With the continuous development of cloud computing, cloud applications show a booming trend. At present, cloud applications are often deployed in running containers of edge servers in order to support running of the cloud applications. In addition, in order to support the implementation of complex businesses of cloud applications, many public service components are deployed for edge servers to support the implementation of businesses of edge servers in the cloud application process. However, due to discrete positions of the clients, the edge servers supporting running of the cloud applications all require the deployment of many public service components in order to enable the operation objects of the cloud applications to have a good operation experience through corresponding clients. It can be seen that the use of the existing cloud application running method may result in a waste of component resources.

SUMMARY

Embodiments of this application provide a data processing method and system, a related device, a storage medium, and a product, which can avoid the waste of component resources.

An embodiment of this application provides a data processing method applied to a cloud processing system, the cloud processing system comprising a central cluster and a target edge server sharing multiple services provided by the central cluster with other edge servers, wherein the target edge server is physically closest to a client of a target cloud application, the method being performed by the target edge server and comprising:

Acquiring running data of the target cloud application from the client;
  transmitting the running data to the central cluster via a first communication channel between the target edge server and the central cluster in response to the running data being first-type data, the first communication channel being a channel matching a real-time requirement of the first-type data; and
  transmitting the running data to the central cluster via a second communication channel in response to the running data being second-type data, the second communication channel being a channel matching a real-time requirement of the second-type data, and the real-time requirements of the first-type data and the second-type data being different.

An embodiment of this application provides a cloud processing system, the cloud processing system including a central cluster and a plurality of edge servers sharing multiple services provided by the central cluster, the plurality of edge servers including a target edge server including any one of the plurality of edge servers that is physically closest to a client of a target cloud application;
  the target edge server being configured to acquire running data of the target cloud application, transmit the running data to the central cluster via a first communication channel with the central cluster in response to the running data being first-type data; and transmit the running data to the central cluster via a second communication channel with the central cluster in response to the running data being second-type data, the first communication channel being a channel matching a real-time requirement of the first-type data, the second communication channel being a channel matching a real-time requirement of the second-type data, and the real-time requirements of the first-type data and the second-type data being different; and
  the central cluster being configured to receive the running data transmitted by the target edge server, respond to the first-type data with a service matching the first-type data in response to the running data being the first-type data; and respond to the second-type data with a service matching the second-type data in response to the running data being the second-type data.

An embodiment of this application provides an edge server including a processor, an input device, an output device, and a memory, the processor, the input device, the output device, and the memory being connected to each other, the memory being configured to store a computer program supporting the edge server to perform the method described above.

An embodiment of this application provides a non-transitory computer-readable storage medium storing program instructions that, when executed by a processor of an edge server, cause the edge server to perform the method according to the first aspect as applied to a cloud processing system comprising a central cluster and the edge server accessing multiple services provided by the central cluster.

In the embodiments of this application, based on the centralized management by the cloud processing system on the central cluster providing public services, any edge server in the cloud processing system can share and reuse public services by invoking corresponding service components in the central cluster, so that repeated deployment of common components can be avoided and resource utilization of the central cluster can be improved. The communication channels between the edge server and the central cluster in the cloud processing system include a first communication channel and a second communication channel. Upon acquiring the running data of the target cloud application by the target edge server, the running data can be transmitted to the central cluster via the first communication channel if the running data is determined to be first-type data, and the central cluster responds to the first-type data by invoking a corresponding service; and the target edge server can transmit the running data to the central cluster via the second communication channel with the central cluster if the running data acquired by the target edge server is second-type data, and the central cluster responds to the second-type data by invoking a corresponding service. The target edge server invokes public services provided in the central cluster via different communication channels, i.e., different business interactions and data transmissions between the target edge server and the central cluster are implemented based on different communication channels. Therefore, when the target edge server invokes the public services in the central cluster based on different businesses, the data paths for the data of the different businesses are independent from each other and do not affect each other, thus enabling concurrent execution of the different businesses, and improving security of transmission of business data between the target edge server and the central cluster.

BRIEF DESCRIPTION OF THE DRAWINGS

In order to illustrate the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

An embodiment of this application below provides a data processing method applicable in a cloud processing system. In the cloud processing system, a plurality of edge servers for running a cloud application are deployed separately in different physical position regions (or physical edge zones), and the edge servers in the different position regions are configured to support the display of an application picture of the cloud application in clients within corresponding regions, so that the client of the cloud application can access an edge server with a relatively short physical distance (i.e., the physical distance is less than or equal to a distance threshold) and acquire a rendering resource for the cloud application picture from the accessed edge server, thus further rendering and displaying the application picture of the cloud application based on the rendering resource. By accessing the edge server with the relatively short physical distance and acquiring the rendering resource, the rendering speed of the application picture of the client can be effectively improved, thereby improving the running fluency of the cloud application in the client. The cloud application is an application program based on cloud computing. In this running mode, all cloud applications run on the server end, and the rendered application pictures are compressed and transmitted to the client via the network. Accordingly, the client can acquire, via a terminal device, an operation event related to the cloud application, such as a touch screen event, a keyboard and mouse event, and a joy stick event, and transmit the operation event to the server end via the network, so as to achieve the purpose of interacting with the cloud application. It is to be understood that the server end for supporting running of the cloud application is the edge server described above, and the edge server supports running of the cloud application by creating a cloud end instance. In one embodiment, the cloud end instance refers to a virtual running container which actually runs for the cloud application during the cloud application process, and the cloud application runs in the running container in the edge server, where the running container can be an Android container.

Figure 1A:
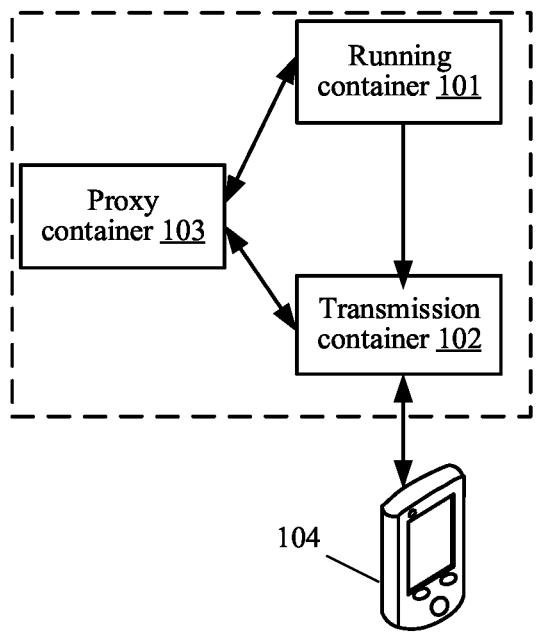
FIG. 1a is a running diagram of a cloud application according to an embodiment of this application.

In one embodiment, the cloud end instance further includes a transmission container and a proxy container, where the connection relationships among the running container, the transmission container, the proxy container, and the client may be shown in FIG. 1a, and the cloud end instance includes a running container 101, a transmission container 102, and a proxy container 103 which are identified by the dashed box in FIG. 1a. The running container is used for installing and running a cloud application, and can encode and then transmit an application picture of the cloud application to the transmission container. One side of the transmission container establishes a communication connection with the client 104, and the other side establishes a communication connection with the running container (or an encoding course of the running container). Therefore, after acquiring encoded data of the application picture from the running container, the transmission container can transmit the encoded data to the client, and the client can thus decode the acquired encoded data and render and display the application picture in the interface. The transmission container may be a web real time clock (WebRTC) container, and the communication connection established between the transmission container and the client may be a peer to peer (P2P) connection. In addition, the proxy (instance) container may also become a proxy for maintaining the creation/destruction of application instances and various state transitions during the life cycle, and establishing communication channels with the inside of the central cluster for the running container and the transmission container, such as accessing databases and message queue of the central cluster.

Figure 1B:
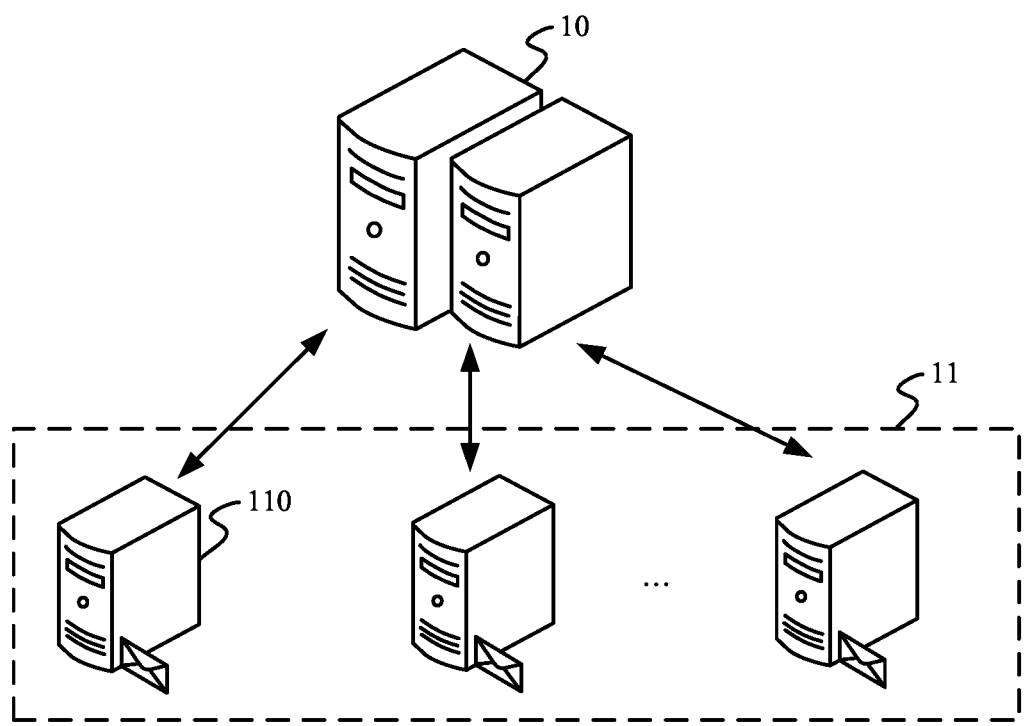
FIG. 1b is a schematic diagram of a cloud processing system according to an embodiment of this application.

In one embodiment, the cloud processing system further includes a central cluster for deploying public services of the cloud application, such as a running analysis service and a basic instruction service. The running analysis service refers to a service for analyzing a running condition, such as stuttering and lag, of a cloud application, and the basic instruction service is opposite to an operation service for the cloud application, where the operation service refers to a service for updating the application picture, and the basic instruction service includes services, such as login authentication and data storage, provided for the cloud application. It is to be understood that the update of the application picture can be performed by the application container of the edge server, while other operation instructions than the update request for the application picture need to be performed by invoking common components in the central cluster. Therefore, in the embodiment of this application, any other service than requesting the update of the application picture may be used as the basic instruction service. In one embodiment, the connection relationship between the central cluster and the edge servers included in the cloud processing system may be shown in FIG. 1b, where a plurality of edge servers in the cloud processing system share multiple services provided by the central cluster. The central cluster may be formed by one or more computer devices (such as the computer device 10 shown in FIG. 1b), and the edge server 11 can also be a server or a server cluster formed by a plurality of servers. In the embodiment of this application, the edge server is mainly exemplified as a server. The different edge services are configured to support running of the cloud application in different geographical position regions. For example, the server 110 shown in FIG. 1b is different from other servers in the geographical position region where running of the cloud application is supported correspondingly.

Figure 1C:
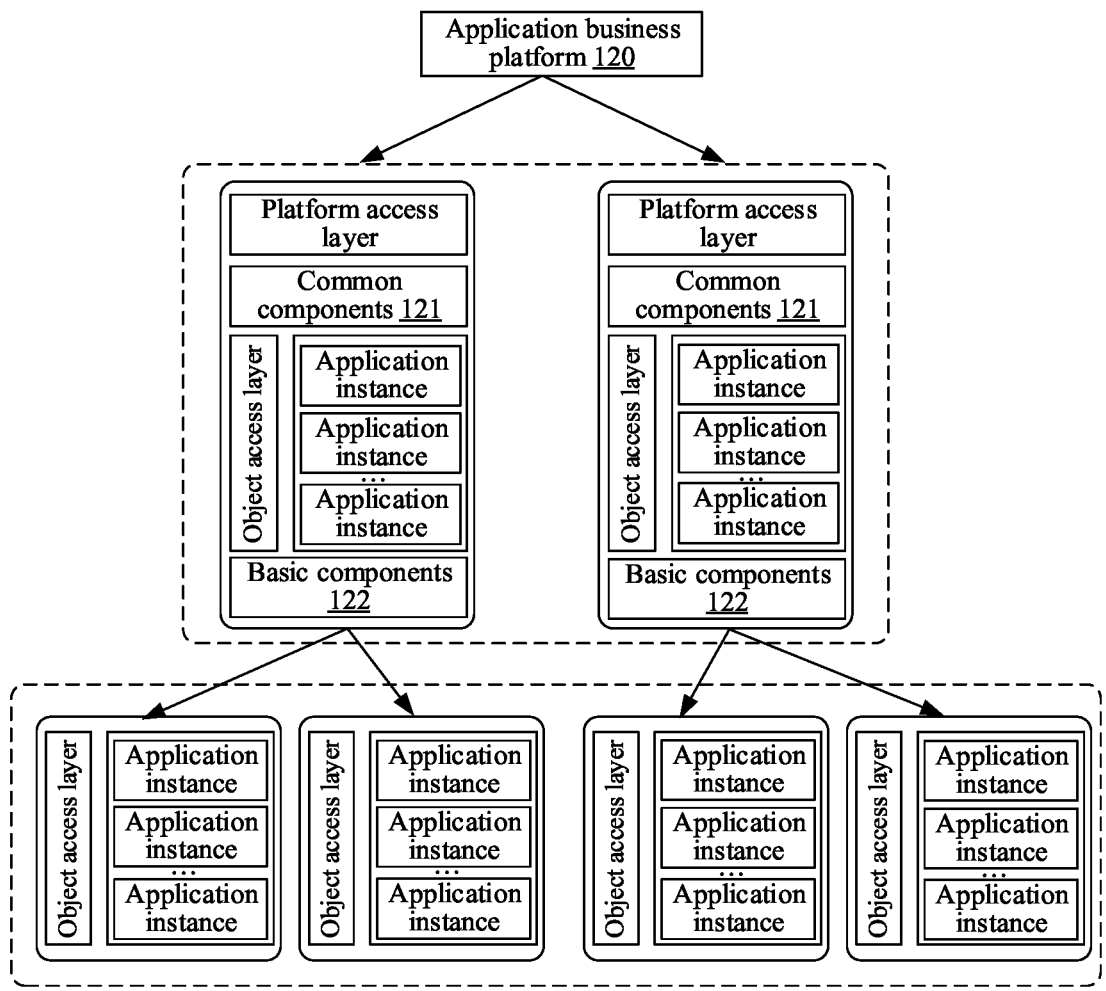
FIG. 1c is a schematic diagram of another cloud processing system according to an embodiment of this application.

Based on the deployment of the cloud processing system, the plurality of edge servers in the cloud processing system may share the public services provided by the central cluster, so that the edge servers can invoke the public services of the central cluster via the communication connection with the central cluster, and thus the public services in the central cluster are reused in the edge servers in different geographical position regions. That is, based on the deployment of the public services in the central cluster and the sharing and reuse of the public services in the central cluster by the edge servers, the public services do not need to be deployed repeatedly in the edge servers. Therefore, the edge servers can then be deployed in a light weight, i.e., only relevant components for supporting running of the cloud application may be deployed in the edge servers, and only outflow components related to the application picture of the cloud application can be deployed in the edge servers. In one embodiment, the deployment of components in the central cluster and the edge servers may be shown in FIG. 1c. As shown in FIG. 1c, the central cluster accesses different application backgrounds through an application business platform 120, and the central cluster includes common components 121 providing public services and basic components 122. The edge servers reuse the common components and the basic components in the upper central cluster, so that the edge servers do not require repeated deployment of the common components and the basic components, and only cloud application instances need to be deployed in the edge servers.

In one embodiment, the public services are implemented by deploying corresponding common components in the central cluster. For example, the public services may include authentication, caching, scheduling, etc., so the common components deployed in the central cluster may include an authentication component, a caching component, a scheduling component, etc. As the edge servers may share and reuse the public services provided by the common components in the central cluster, it is possible to avoid the repeated deployment of the common components in the edge servers, thereby improving the utilization of the common components in the central cluster and avoiding the waste of component resources.

In one embodiment, based on the deployment mode of the edge services in the cloud processing system, an edge server is only configured to execute an outflow service of the application picture (i.e., a service for outputting encoded data of the application picture) when the edge server runs a cloud application, and the implementation of other public services will invoke corresponding common components in the central cluster via a communication connection with the central cluster. The communication connection between the edge server and the central cluster includes a first communication channel and a second communication channel, where the edge server can transmit the running data to the central cluster via the first communication channel in response to the running data being first-type data, so that the central cluster responds to the running data with a service matching the running data. The edge server may transmit the running data to the central cluster via the second communication channel in response to the running data being second-type data, and enable the central cluster to respond to the running data by invoking a service matching the running data. The first communication channel is a channel which can satisfy a real-time requirement of the first-type data, and the second communication channel is a channel which can satisfy a real-time requirement of the second-type data, and the real-time requirements of the first-type data and the second-type data are different. The central cluster is configured to receive the running data transmitted by the edge server, respond to the first-type data with a service matching the first-type data in response to the running data being the first-type data; and respond to the second-type data with a service matching the second-type data in response to the running data being the second-type data. It is to be understood that invoking different services in the central cluster separately via two different communication channels can effectively avoid the mutual influence between the different paths, thereby ensuring the business security of the edge server when invoking the public services in the central cluster, and thus improving the data security and the stability of the cloud processing system.

In the embodiment of this application, the real-time requirement of the first-type data may be that the transmission delay is less than a first delay threshold, and the real-time requirement of the second-type data may be that the transmission delay is less than a second delay threshold, where the first delay threshold is different from the second delay threshold. In practice, the channel delay of the first communication channel is less than the first delay threshold, i.e., the first communication channel can satisfy the real-time requirement of the first-type data. The channel delay of the second communication channel is less than the second delay threshold, i.e., the second communication channel can satisfy the real-time requirement of the second-type data.

Figure 2:
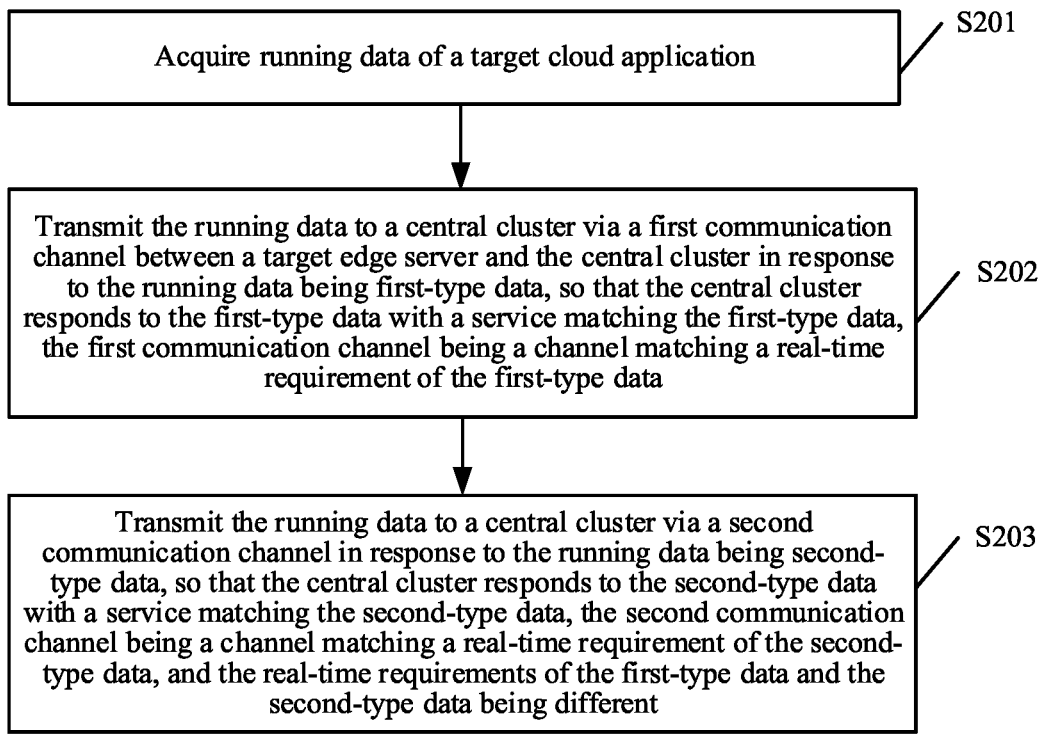
FIG. 2 is a flow diagram of a data processing method according to an embodiment of this application.

Based on the cloud processing system above, the processing of data instructions related to a target cloud application based on the cloud processing system is described in detail with the cloud application being exemplified as the target cloud application. The embodiment of this application is mainly detailed with a target edge server executing the target cloud application as an execution entity. The target cloud application is run in a plurality of different edge servers, where one edge server is configured to support running of the cloud application in a client within a corresponding physical position range, and the target edge server may be any one of the plurality of edge servers running the target cloud application that is physically closest to the client of the target cloud application, or may not be the edge server corresponding to the shortest physical distance. If the edge server in the plurality of edge servers that is physically closest to the client of the target cloud application is working normally (or working normally and the occupied processing resource is less than the threshold), the edge server physically closest to the client of the target cloud application is preferably used as the target edge server. If the edge server physically closest to the client of the target cloud application is working abnormally or the occupied processing resource is greater than or equal to the threshold, another edge server that is not physically closest may be used as the target edge server, e.g., the edge server corresponding to a next-shortest physical distance may be used as the target edge server. In the embodiment of this application, the detailed description is mainly given with the target edge server being exemplified as the edge server that is physically closest to the client of the target cloud application. Reference may be made to a flow diagram of a data processing method shown in FIG. 2. As shown in FIG. 2, the method includes steps S201 to S202 which are described below in conjunction with FIG. 2.

S201: Acquire running data of the target cloud application, e.g., from the client.

S202: Transmit the running data to the central cluster via a first communication channel between the target edge server and the central cluster in response to the running data being first-type data, so that the central cluster responds to the first-type data with a service matching the first-type data. The first communication channel is a channel matching a real-time requirement of the first-type data.

Figure 3:
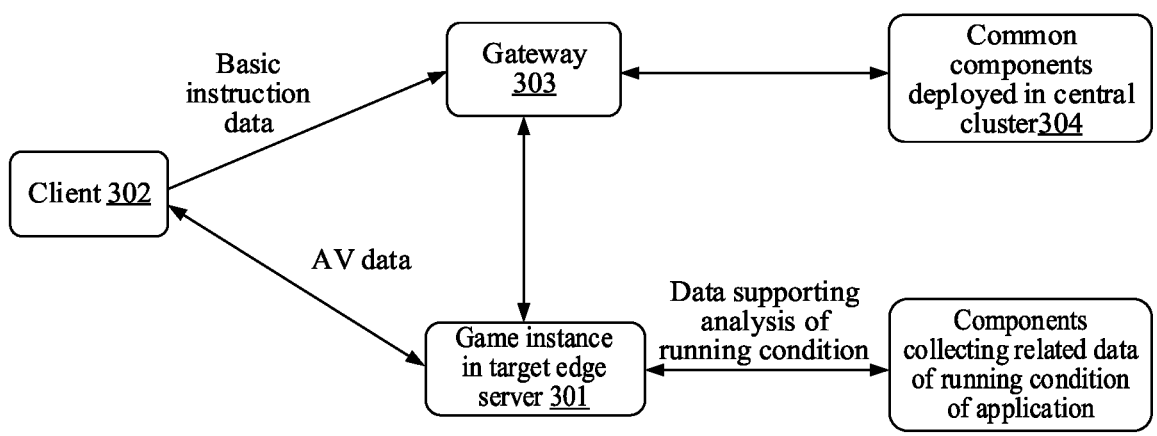
FIG. 3 is a schematic diagram of related data flow in a cloud application according to an embodiment of this application.

In steps S201 and S202, the target cloud application is any one of cloud applications supported by the target edge server to run, and an application picture of the target cloud application is obtained by rendering according to a rendering resource acquired by a corresponding client from the target edge server. In one embodiment, when the target cloud application runs in the target edge server, the target edge server can acquire running data related to a running process of the target cloud application, where the running data of the target cloud application mainly includes audio and video (AV) data, basic instruction data (or a basic application instruction, which may be an authentication instruction or a data storage instruction, etc.) for the target cloud application, and data (such as log data, summary data, etc.) supporting analysis of the running condition of the target cloud application. In addition, there are three types of data paths related to the target cloud application as shown in FIG. 3. As shown in FIG. 3, the AV data is transmitted via the data path between the game instance in the target edge server 301 and the client 302, and is generally streamed to the client form a transmission container in the target edge server. It is to be understood that, as the client performs the rendering and display of the application picture with the AV data (or encoded data of the AV data) acquired from the target edge server, the real-time requirement of the data channel for transmitting the AV data is the highest; in addition, in the process of data transmission, the packet loss rate of data is required to be lower than a preset packet loss threshold, so as to avoid frame loss and stuttering from affecting the user experience.

Furthermore, the basic instruction data may also be referred to as a basic application instruction, which refers to some general instruction transmitted by the client. The basic instruction data may be forwarded to the common components in the central cluster 304 via a gateway 303 to request public services, or to the target edge server to request an updated display of the application picture. The public services forwarded to the common components and requested may include services that open applications, services that open billing, and instances of control transfer. It can be seen that the communication channels involved in the basic instruction data include a communication channel between the client and the common components in the central cluster and the communication channel between the client and the target edge server. While the data path for the basic instruction data has a certain real-time requirement, the client can be triggered for retransmission after the loss of the basic instruction data. Therefore, the data path for the basic instruction data has a relatively lower real-time requirement as compared with the AV data, i.e., the channel delay of the data channel for transmitting the basic quality data may be higher than the channel delay of the data channel for transmitting the AV data. In addition, since the process of analyzing the running condition of the target cloud application may be a process performed in real time or performed based on analysis requirements, the real-time requirement of the data supporting analysis of the running condition of the target cloud application is the lowest real-time requirement of the data described above. In one embodiment, since there is a difference in the real-time requirement for public service requests from the running data acquired by the target edge server, the target edge server may divide the acquired running data which needs to request the public services into first-type data and second-type data based on the difference in the real-time requirement of the running data. If the first delay threshold corresponding to the first-type data is greater than the second delay threshold corresponding to the second-type data, the real-time requirement of the first-type data is lower than the real-time requirement of the second-type data. If the first delay threshold corresponding to the first-type data is less than the second delay threshold corresponding to the second-type data, the real-time requirement of the first-type data is higher than the real-time requirement of the second-type data. In the embodiment of this application, the real-time requirement of the first-type data is exemplified as being lower than the real-time requirement of the second-type data. And it is to be understood that if the running data includes basic instruction data, the basic instruction data is the second-type data, and if the running data includes data supporting analysis of the running condition of the target cloud application, the data for analyzing the running condition of the target cloud application is the first-type data.

In one embodiment, the data supporting analysis of the running condition of the target cloud application may be summary data of frame data generated by an application instance of the target edge server in the process of transmitting the AV data to the client. Therefore, the summary data may be used to perform lag and stuttering analysis on the process of transmitting the AV data of the cloud application to the client for rendering and displaying the application picture, and finally quantify the running condition of the cloud application based on the lag and stuttering analysis.

For example, the running condition of the cloud application may include a quantified running stuttering degree of the program. In determining the running stuttering degree of the program, all the operation events and the user interface update time in the summary data can be counted, and the time periods without an operation event and a user interface update event are eliminated to obtain an active interval of the cloud application. Then, the response time of each event is determined, the number of times of exceeding the response time threshold is counted and recorded as n, and the average interval of the occurrence of a long-time response lag during the running of the cloud application program is determined, so as to obtain a long-time response lag condition of a single operation of the cloud application. Then, the stuttering windows are determined by counting a number (e.g., a preset number) of response lags in the summary data over a continuous period by using sliding windows. In implementation, the active interval may be divided into sub-intervals based on a preset duration (set to 5 seconds), and every 8 sub-intervals are assumed to be a sliding window (set to 40 seconds). If the number of times that the message response time exceeds the response time threshold (set to 200 ms) in each window is greater than or equal to 6, the current window is considered as a stuttering window, and the process moves to a right sub-interval to enter the next window until all the windows in the active interval are determined, so as to obtain a stuttering window set. A proportion of the stuttering windows in the active interval of the cloud application is then calculated. The running stuttering degree of the program is characterized by the lag condition of a single operation and the proportion of the stuttering windows In the active region of the cloud application.

The process of analyzing the target cloud application is performed by the running analysis service provided by the analysis component in the common components. Therefore, after collecting data (such as the summary data above) for analyzing the running condition of the target cloud application, the target edge server can transmit the collected data to the analysis component for analysis. The process of analyzing the running condition of the cloud application can be performed in real time, or performed only when there is an analysis demand. Therefore, it is not necessary to respond to data immediately upon the target edge server collecting the data for analyzing the running condition of the target cloud application, but the packet loss rate is required to be less than a certain packet loss threshold. If the packet loss rate of the data is higher than the packet loss threshold, the analysis result of the running condition of the target cloud application will be affected. In addition, in addition to the summary data above used for recording the process of transmitting the AV data by the application instance of the target edge server, the data for analyzing the running condition of the target cloud application can included log data generated by the target cloud application during other running processes (such as during background running), so as to comprehensively assess the running process of the target cloud application, such as assessing the resource occupation of the target cloud application during the running process. In the embodiment of this application, the data for analyzing the running condition of the target cloud application is exemplified as the summary data for recording the AV data transmission process.

Based on the data paths corresponding to the related data generated by the target cloud application above in the running process, the target edge server can use different communication channels involved in the above cloud processing system to transmit the three types of data above based on the real-time requirements of the related data above and the data streaming directions of the three types of data above, so as to avoid the mutual influence between the different communication channels, improve the reliability in processing the related data of the cloud application, and improve the stability of the cloud processing system.

In one embodiment, the above cloud processing system also designs three corresponding communication channels that are different, where in the cloud processing system, the communication channels between the central cluster and the edge server (such as the target edge server) include a first communication channel and a second communication channel, and the communication channel included between the edge server and the client is used for transmitting the AV data above. The first communication channel and the second communication channel are included between the central cluster and the edge server in the cloud processing system for data interaction. After being acquired by the target edge server, the basic instruction data related to the target cloud application and the data for analyzing the running condition of the target cloud application both needs to be transmitted to the central cluster, and related public services in the central cluster are invoked to respond to the basic instruction data and analyze the running condition of the target cloud game. Therefore, in order to avoid the business conflicts generated in the process of transmitting the basic instruction data and the data for analyzing the running condition of the target cloud application, the target edge server may separately transmit the basic instruction data and the data supporting analysis of the running condition of the target cloud application to the central cluster via different communication channels.

Based on the real-time requirement of the target edge server after acquiring the running data, the target edge server may, upon acquiring the running data, determine that the acquired running data is the first-type data if the acquired running data is the data for analyzing the running condition of the target cloud application, and transmit the running data via the first communication channel, so that the central cluster can respond to the first-type data with a service matching the first-type data after acquiring the first-type data; and the target edge server may determine that the acquired running data is the second-type data if the running data acquired by the target edge server is basic instruction data, and transmit the second-type data via the second communication channel, so as to enable the transmission of the data using the first communication channel or the second communication channel based on the real-time requirement of the running data, which can effectively improve the security of the cloud processing system, and ensure the data security in the process of data transmission. That is, if the running data acquired by the target edge server is the data for analyzing the running condition of the target cloud application, the target edge server can transmit the data for analyzing the running condition of the target cloud application to the central cluster via the first communication channel. In some embodiments, the data for analyzing the running condition of the target cloud application is transmitted by the target edge server to the analysis component of the central cluster via the first communication channel, so as to realize invoking the running analysis service provided by the analysis component in the central cluster. However, if the running data acquired by the target edge server is the basic instruction data for the target cloud application, the data can be transmitted via the second communication channel, i.e., step S203 can be carried out instead.

In one embodiment, if the first-type data is the data for analyzing the running condition of the target cloud application with a low real-time requirement, the target edge server can immediately transmit the first-type data to the central cluster via the first communication channel after acquiring the first-type data, so as to realize real-time analysis on the running condition of the target cloud application. Alternatively, the target edge server can first cache the acquired first-type data in a storage space after acquiring the first-type data, and transmit the first-type data to the central cluster via the first communication channel in response to a need for analyzing the running condition of the target cloud application, so as to analyze the running condition of the target cloud application. After the target edge server acquires the first-type data, the target edge server may first store a backup of the acquired first-type data in the local disk, and then transmit the first-type data to the central cluster via the first communication channel through a public network, so that the target edge server may initiate retransmission based on the backup of the first-type data in the local disk in response to the loss of the first-type data in the transmission process, so as to ensure that the central cluster may receive correct and complete first-type data, thereby improving the accuracy of analysis of the target cloud application.

In one embodiment, the target edge server may cache the first-type data in a local storage space after acquiring the first-type data, or transmit the first-type data to a block chain network for caching, and acquire the first-type data from the block chain network in response to a need for transmitting the first-type data to the central cluster. Based on the caching of the first-type data in the block chain network, the first-type data can be effectively prevented from being manipulated. In one embodiment, the running data of the target cloud application acquired by the target edge server is acquired based on a physical distance range. Any edge server in the cloud processing system is configured to support running of a client corresponding to the cloud application within a physical range, and the physical distance between the client of the cloud application supported by the any edge server and the any edge server is necessarily less than the physical distance between the client of the cloud application and other edge servers. Therefore, the running data of the target cloud application acquired by the target edge server is acquired from the client of the target cloud application that is physically closest to the target edge server. The target edge server can determine a physical distance between the target edge server and a corresponding client through an Internet protocol (IP) address of the target edge server and an IP address of a corresponding terminal device of the corresponding client. In implementation, a physical position (which may be longitude and latitude information) of the target edge server may be determined based on the IP address of the target edge server, a physical position of the terminal device may be determined based on the IP address of the terminal device, and then the physical distance between the target edge server and the terminal device may be determined based on the physical position of the target edge server and the physical position of the terminal device.

S203: Transmit the running data to the central cluster via a second communication channel in response to the running data being second-type data, so that the central cluster responds to the second-type data with a service matching the second-type data.

The second communication channel is a channel which can satisfy a real-time requirement of the second-type data, and the real-time requirements of the first-type data and the second-type data are different.

When the target cloud application runs in the target edge server, the target edge server can determine that the acquired running data is the second-type data if the running data acquired by the target edge server is the basic instruction data, so that the basic instruction data can be transmitted to the central cluster via the second communication channel for corresponding processing. The basic instruction data is related to the display of the application interface of the target cloud application, and the application picture of the target cloud application is sent to the client for display. Therefore, based on the display of the application picture of the target cloud application by the client, the operation object of the target cloud application can transmit relevant instruction data for the target cloud application to the target edge server through the application picture displayed in the client, where the relevant instruction data transmitted by the application object to the target edge server through the client includes the basic instruction data and operation instruction data. In one embodiment, the application pictures displayed in the client include a basic picture and an operation picture, where the operation picture refers to an interface (such as a main application interface of the target cloud application) upon entering the actual application environment, and the basic picture refers to an interface displayed to the application object before entering the actual application environment, such as a login interface, an application resource update interface, etc. It is to be understood that, when the application picture displayed in the client is the basic picture, the instruction data generated based on operations performed by the operation user in the basic picture is the basic instruction data. However, when the operation picture is displayed in the client, the instruction data generated based on operations performed by the operation user in the operation picture becomes the operation instruction data. Since the operation instruction data includes instructions for controlling the display of the application picture of the target cloud application, such as an instruction for controlling a virtual object in a target cloud game, the basic instruction data includes other general instructions except the instructions controlling the virtual object. The operation object refers to an object that triggers running of the target cloud application and manipulates the target cloud application. In one embodiment, if the target cloud application is a target cloud game and the operation picture refers to the interface entering the actual game environment, in the operation picture corresponding to the actual game environment of the target cloud game, a corresponding operation object can control the virtual character displayed in the operation picture.

Since the target edge server updates the application picture based on operation instruction data after acquiring the operation instruction data for the target cloud application from the client, the target edge server may, after acquiring the operation instruction data, trigger running of the running container of the target cloud application to update the application picture currently displayed in the client, encode and then transmit the updated application picture to the transmission container, and finally send same to the client, so that the application picture displayed in the client is updated. In another implementation, if the target edge server acquires basic instruction data for the target cloud application from the client, the target edge server, after acquiring the basic instruction data, needs to forward the basic instruction data to the central cluster to request invoking related public services in the central cluster to respond to the basic instruction data since the target edge server only supports for a picture update service while the basic instruction data mostly needs to request other public services in addition to the picture update service. When the target edge server forwards the basic instruction data to the central cluster, the target edge server may forward the basic instruction data to the central cluster via the second communication channel based on two different communication channels existing in the cloud processing system, so that the central cluster responds to the basic instruction data with the basic instruction service. Any public service deployed in the central cluster may be implemented by one or more service components, and one service component may correspond to one or more servers.

In the embodiments of this application, based on the centralized management by the cloud processing system on the central cluster providing public services, any edge server in the cloud processing system can share and reuse public services by invoking corresponding service components in the central cluster, so that repeated deployment of common components can be avoided and resource utilization of the central cluster can be improved. The communication channels between the edge server and the central cluster in the cloud processing system include a first communication channel and a second communication channel. Upon acquiring the running data of the target cloud application by the target edge server, the running data can be transmitted to the central cluster via the first communication channel if the running data is determined to be first-type data, and the central cluster responds to the first-type data by invoking a corresponding service; and the target edge server can transmit the running data to the central cluster via the second communication channel with the central cluster if the running data acquired by the target edge server is second-type data, and the central cluster responds to the second-type data by invoking a corresponding service. The target edge server invokes public services provided in the central cluster via different communication channels, i.e., different business interactions and data transmissions between the target edge server and the central cluster are implemented based on different communication channels. Therefore, when the target edge server invokes the public services in the central cluster based on different businesses, the data paths for the data of the different businesses are independent from each other and do not affect each other, thus enabling concurrent execution of the different businesses, and improving security of transmission of business data between the target edge server and the central cluster.

Figure 4:
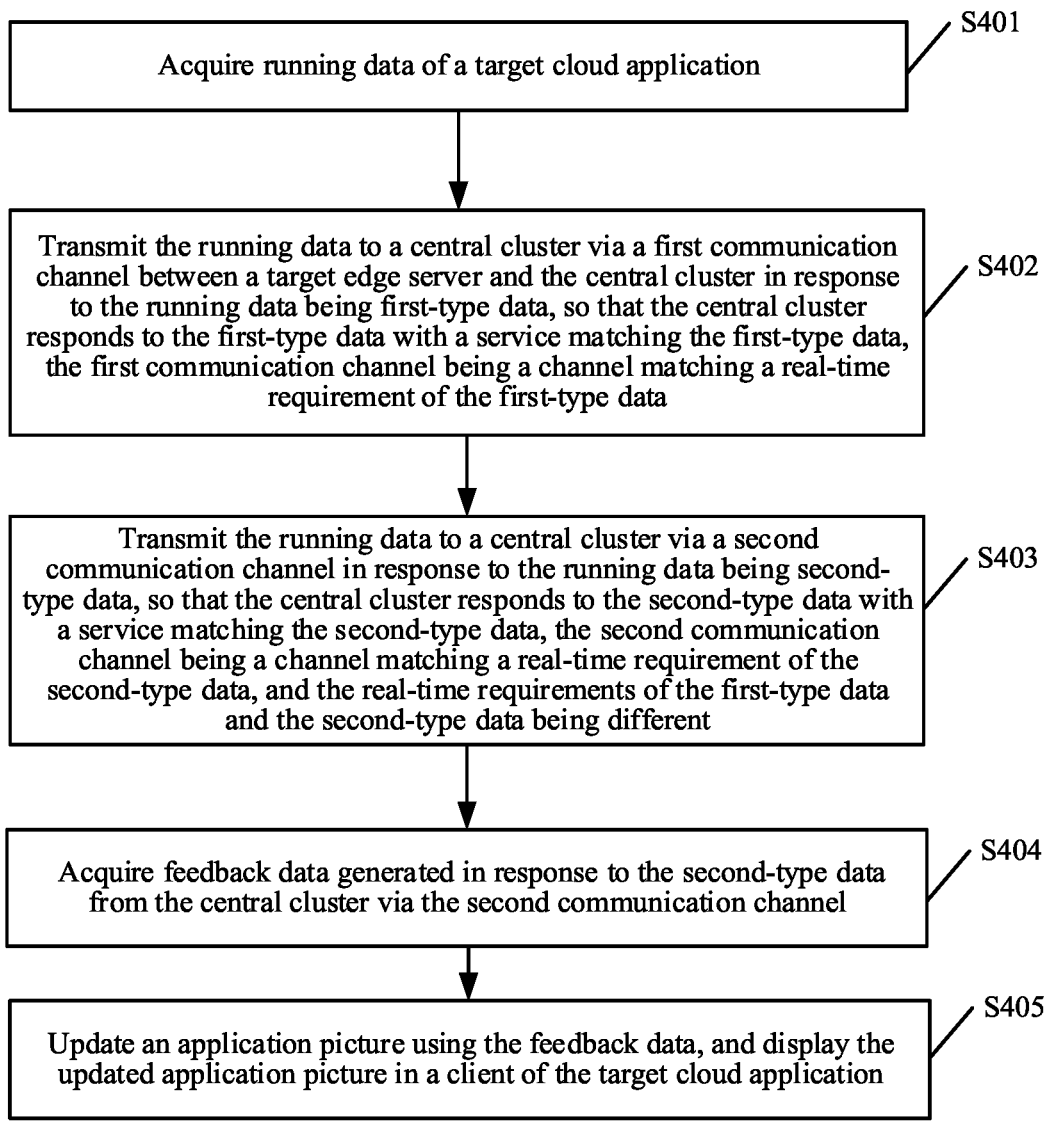
FIG. 4 is a flow diagram of another data processing method according to an embodiment of this application.

Reference is made to FIG. 4 which is a flow diagram of another data processing method according to an embodiment of this application. Likewise, the data processing method provided in the embodiment of this application is also applied in the cloud processing system above, and a plurality of edge servers in the cloud processing system share multiple public services provided by a central cluster, where the data processing method can be performed by a target edge server for running a target cloud application, and the target edge server is any edge server in the cloud processing system that is physically closest to a client of the target cloud application. As shown in FIG. 4, the method may include the following steps:

S401: Acquire running data of the target cloud application, e.g., from the client.

The running data is acquired by the target edge server, where the running data can be data for analyzing the running condition of the target cloud application. In one embodiment, the data for analyzing the running condition of the target cloud application includes summary data acquired in the process of the target edge server sending an application picture of the target cloud application to the corresponding client through an application instance. When the target edge server sends the application picture to the client, the application picture is sent by a transmission container included in the application instance of the target edge server running the target cloud application. Therefore, a proxy container included in the application instance can acquire the summary data of the target cloud application based on the process of the transmission container sending the application picture to the client. In one embodiment, the target edge server including the application instance may also be referred to as an outflow node since the application instance in the target edge server will be responsible for the transmission process of the application picture of the target cloud application. It is then to be understood that the outflow node is a node responsible for running the application instance in a cluster related to the cloud application, and the node actually includes a server bearing a running container, such as an advanced RISC machine (ARM) server (a server based on a processor supporting mobile end applications), and a transmission container responsible for transmitting an encoded video stream to a user, and the server bearing the transmission container can be an x86 (a processor supporting personal computer end applications) server or an ARM server, for example. In addition, the data for analyzing the running condition of the target cloud application can also be log data generated when the target cloud application runs in the target edge server, and the target edge server can acquire the log data during the running process of the target cloud application, or acquire the log data after the running of the target cloud application is ended.

Figure 5A:
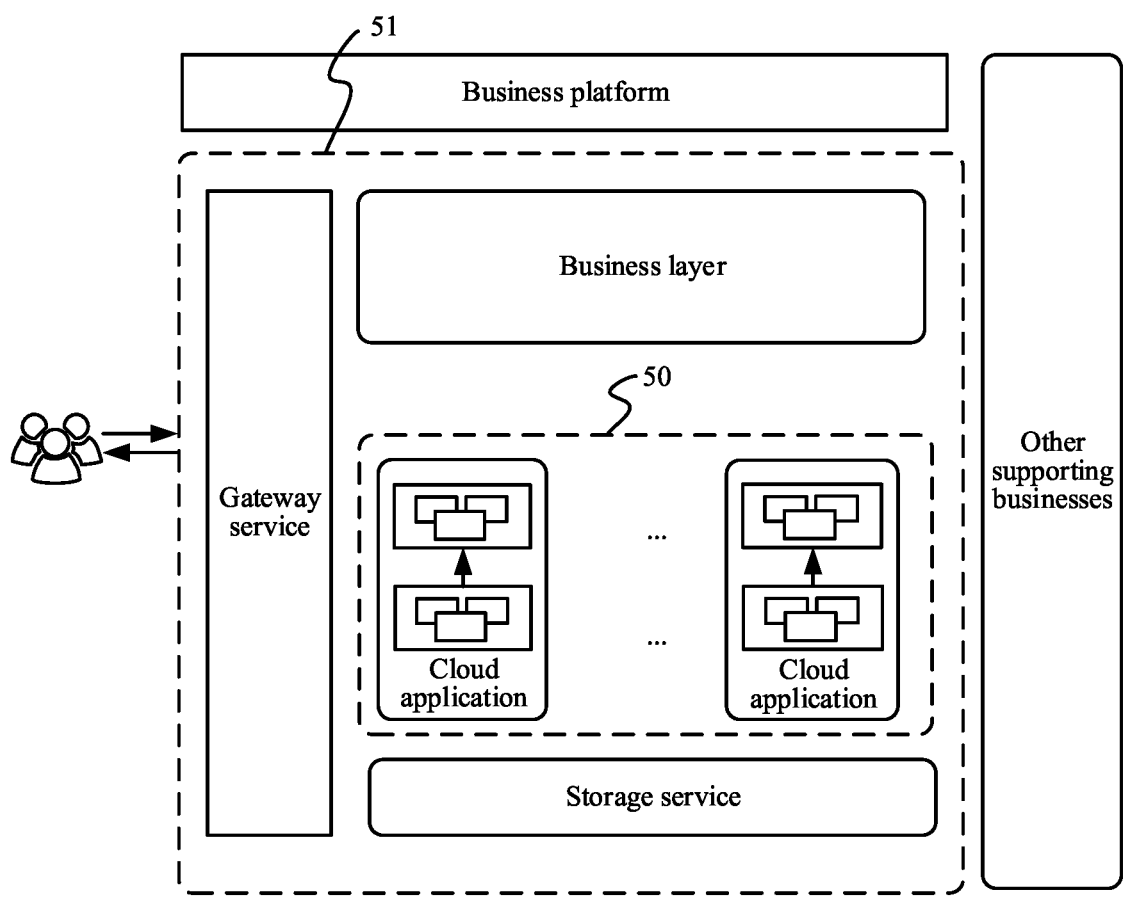
FIG. 5a is a schematic diagram of an architecture of a cloud processing system according to an embodiment of this application.

In one embodiment, the target edge server bearing and running the target cloud application can be implemented based on a middle platform deployment architecture of the cloud application as shown in FIG. 5*a*, and it is to be understood that the middle platform deployment architecture of the cloud application is also a deployment architecture of the central cluster of the cloud processing system above. In the deployment architecture shown in FIG. 5*a*, the node 50 is the outflow node, the services 51 in the dashed box are the public services, and the node running the public services is isolated as a management and control node for managing and controlling the application instance of the cloud application. This kind of node is used for running common components of cloud applications such as a database, message queue, a caching component, a gateway access component, a user authentication component, an outflow node scheduling component, etc. Based on the deployment architecture, the central cluster may provide gateway services through a variety of different gateways, where the gateway included in the central cluster may be an edge gateway (edge GW) for accessing a business platform. The business platform refers to a running platform of the management background, and the edge GW is connected to the business platform and provides the same entrance for the management background. The edge GW, which may also be referred to as a background gateway, is mainly used for performing security checks on requests coming from the management background and forwarding to the correct internal services based on the different businesses. In addition, other gateways may also be included in the deployment architecture, such as a signal gateway (signal GW) and a stream gateway (stream GW), which may be collectively referred to as user gateways and used for accessing the operation object of the outflow instance in the user cluster. The operation object corresponding to the outflow instance of the edge cluster can be accessed inside through the outflow instance of the edge server. In one embodiment, when accessing the deployment architecture, the operation object can first install a software development kit (SDK) of a corresponding cloud application in a corresponding terminal device, so that the terminal device of the operation object has the capability of rendering an application picture of the corresponding cloud application, and then access can be achieved through a specific input/output interface and user gateways in the architecture, thereby achieving the access of the operation object to the deployment architecture, where the input/output interface can be, for example, an F5 interface (a concurrent access interface) of a classic load balancer (CLB). The edge GW, the signal GW, and the stream GW described above are independent gateways, or they may be different service units integrated on one gateway device.

In one embodiment, the business layer included in the public services in the dashed box marked by 51 may include: edge scheduling service (Edge Scheduler), record storage service (Recorder), configuration center (Conf Center), and coding (Transcode), etc. The Edge Scheduler is mainly used for managing the life cycle (creation, initialization, deletion, etc.) of each outflow instance on an outflow node, and the Recorder is also a screen recording service used for transcoding and recording or interfacing an AV stream to a live broadcast platform, so that an operation object can perform live broadcast directly when using the cloud application without consuming the local processing capacity of the terminal device corresponding to the cloud application. The Conf Center is used for providing configuration capabilities, such as the version of the outflow component, as well as requirements for resources during running (such as the amount of processing resources and memory that will to be occupied), etc. The Transcode is used for encoding the AV stream, etc. In the outflow node 50, any outflow node includes a running container, a transmission container, and a proxy container, separately. In addition, the outflow node may further include a license node for creating a key and transmitting the created key to the operation object. The license center of the public services is used for performing security verification on the key transmitted from the license node to the operation object, where the key is used for providing a security authentication capability. The outflow instance will generate several keys at the beginning of creation, and these keys will be subsequently distributed to operation object. When the operation object requests a gateway to establish a connection based on the key, the gateway will pass the key to an authentication service for authentication.

In addition, the public services in the deployment architecture further include a storage service for providing a basic storage function, which may be implemented by various memories, such as distributed memory (kafka), relational database (MySQL), remote dictionary service-based memory (Redis), registry-based memory (Registry), and file memory (Filesever). In addition, the public services include a quota management service, a data preprocessing service, a monitor service, and a statistics service. The quota management service is mainly used for uniformly calculating the current resource usage condition by the cluster, such as the number of the central processing unit (CPU)/memory/graphics processing unit (GPU) resources to be allocated in creation of an instance, and the quota management service is therefore used for uniformly calculating and allocating the number of the resources required. Traditional streaming processing is difficult to meet performance requirements due to the large amount of data to be processed. Therefore, the data preprocessing service can be used to preprocess the data generated by each instance first, and then the summarized data is put into a streaming processing flow for analysis and report presentation (i.e., subsequently pushed to a middle platform of data and an operation and maintenance monitoring platform for analysis and presentation). The monitor service is used for real-time monitoring of various health indicators of the cloud application system. The statistics service is one that summarizes the status of instances of the cloud application for providing a monitor with basic data for business monitoring.

Based on the middle platform deployment architecture for the cloud application above, the public services are centralized in the central cluster 51. The public services in the central cluster are shared and reused by deploying edge servers in an edge cluster, where the edge servers in the edge cluster may each realize sharing and reuse of the two different public services provided in the central cluster via two different communication channels, separately. In one embodiment, the central cluster includes a central proxy device and an edge management device, and the target edge server is associated with an edge proxy device. If the real-time requirement for data transmission of the first-type data is lower than the real-time requirement for data transmission of the second-type data, the communication channel between the edge proxy device and the central proxy device included in the central cluster is a first communication channel; and the communication channel between the target edge server and the edge management device is a second communication channel. Thus, the target edge server can invoke public services in the central cluster based on the first communication channel and the second communication channel separately based on business requirements. In one embodiment, the target edge server may transmit the acquired first-type data of the target cloud application to the central cluster via the first communication channel, and invoke a corresponding service in the central cluster to respond to the first-type data, i.e., step S402 can be carried out; while when the target edge server acquires the second-type data, the target edge server transmits the second-type data to the central cluster via the second communication channel to invoke a corresponding service in the central cluster to respond to the second-type data, i.e., step S403 can be carried out instead.

S402: Transmit the running data to the central cluster via a first communication channel between the target edge server and the central cluster in response to the running data being first-type data, so that the central cluster responds to the first-type data with a service matching the first-type data. The first communication channel is a channel which can satisfy the real-time requirement of the first-type data.

S403: Transmit the running data to the central cluster via a second communication channel in response to the running data being second-type data, so that the central cluster responds to the second-type data with a service matching the second-type data, the second communication channel being a channel which can satisfy a real-time requirement of the second-type data, and the real-time requirements of the first-type data and the second-type data being different.

Figure 5B:
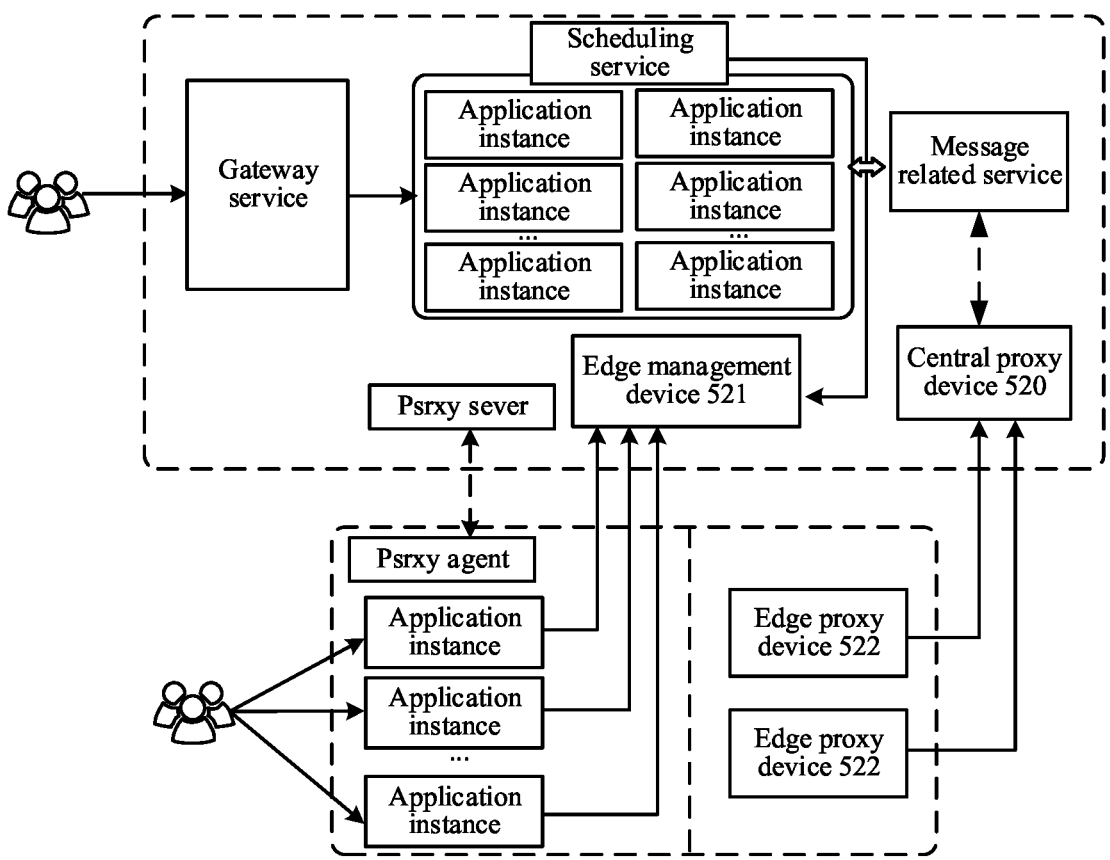
FIG. 5b is a schematic diagram of an architecture of another cloud processing system according to an embodiment of this application.

In step S402 and step S403, the target edge server includes a running container, a transmission container, and a proxy container. The target cloud application runs in the running container of the target edge server, and the transmission container is used for establishing connections with the client and the running container, separately, so as to transmit an encoded application picture of the running container to the client for display. The proxy container is used for establishing communication connections for the transmission container and the running container, and establishing a communication connection with an edge management device in the central cluster. Therefore, the second communication channel refers to a communication channel obtained upon establishing the communication connection between the proxy container and the edge management device. In one embodiment, based on the deployment architecture above, the public services are centralized in the central cluster, and the plurality of edge clusters sharing and reusing the public services in the central cluster may be deployed as shown in FIG. 5b. The central proxy device 520 included in the central cluster is a kafka proxy (a distributed log proxy), and the edge management device 521 is an edge manager (a stateless management node). The edge proxy device 522 associated with the target edge server is a kafka log proxy (a distributed log proxy, which can be the same as or different from the central proxy device). Therefore, it is to be understood that the first communication channel (or data channel) between the target edge server and the central cluster is formed by data communication between the central proxy device and the edge proxy device, and the second communication channel between the target edge server and the central cluster is formed by data communication between the edge management device and the target edge server.

In one embodiment, the edge management device may also be referred to as an edge computing manager (EC manager) which is a stateless edge management device mainly responsible for building the second communication channel between the edge server and the central cluster, and for deploying services for managing the edge server. The management services for the edge server are stateless services, where the stateless services mean that there is no difference among a plurality of management services deployed in the central cluster, and if one of the management services breaks down, another management service may execute instead, thus ensuring the stability of the second communication channel. That is, by deploying the edge management device in the central cluster, the embodiments of this application may proxy communication traffic between common components within the central cluster and the outflow instance of the target edge server through the edge management device. The edge management device enables communication by establishing a WebSocket connection (a long connection) of a bidirectional transport layer security (TLS) protocol with the proxy container of the outflow instance. Then it is to be understood that if the running data acquired by the target edge server is acquired by the proxy container of the target edge server, the acquired running data is the second-type data. When the target edge server transmits the second-type data to the central cluster via the second communication channel between the target edge server and the central cluster, the second-type data is transmitted to the edge management device in the central cluster via the communication connection between the proxy container and the edge management device in the central cluster, thereby transmitting the second-type data to the central cluster.

In one embodiment, the first-type data includes summary data used for recording the process of the application instance outputting the application picture to the client. It can be seen that the amount of data carried in the first communication channel is large. For example, when the current number of daily active users (DAU) of the target cloud application is 0.5 million, the order of magnitude of data transmitted via the first communication channel reaches a tens-of-billions level. However, the real-time requirement of the first-type data is relatively low; that is, the target edge server can transmit running data with a low real-time requirement but a large amount via the first communication channel. As shown in the first communication channel in FIG. 5b, the edge proxy device includes a kafka log proxy, and after acquiring the first-type data (such as the summary data above) transmitted by the outflow instance (i.e., the associated target edge server), the edge proxy device can first land the first-type data in the local disk, and then transmits the first-type data to the central proxy device (kafka proxy) positioned in the central cluster through the public network. Therefore, if the network of the edge proxy device is interrupted due to jitter, a short interruption will occur in the first communication channel. As the edge proxy device continues to reconnect and awaits network reconnection, the first-type data may be retransmitted by using the first-type data stored in the local disk. The first-type data may also be reloaded and continuously transmitted from the local disk to ensure that the first-type data is not lost if there is a restart problem with the edge proxy device due to device or service upgrade or other problems.

In one embodiment, a communication connection is established between the edge proxy device and the central proxy device using a transmission control protocol (TCP), and a cloud load balancer (CLB) device and a firewall are deployed in front of the central proxy device to display a source IP of the device generating the log data to determine data security of the first communication channel. In one embodiment, the load balancer can provide a safe and quick traffic distribution service. Access traffic can be automatically distributed to multiple cloud servers in a cloud via CLB, expanding the service capability of the system and eliminating a single point of failure. The load balancer supports connections of hundreds-of-millions level and concurrent of tens-of-millions level, and can easily respond to large traffic access and meet business requirements. In addition, message transmitting and receiving services can be provided through message queue (MQ) in the central cluster. The MQ is a message-oriented system, and is basic software for completing transmitting and receiving of the message in a distributed system. The MQ can also be referred as message middleware, which refers to performing platform-independent data exchange using an efficient and reliable message delivery mechanism, and performing integration of the distributed system based on data communication. By providing message delivery and message queue models, the communication of a course can be extended in a distributed environment. A psrxy server (a network proxy deployed in the central cluster) and a psrxy client (a network proxy deployed in the edge server) serve as proxy network paths for connecting the central cluster and the edge point of k8s (a resource platform), so that k8s can manage the edge point without paying attention to the network condition of the edge point (whether public or private). k8s, also known as Kubernetes, is a portable and extensible open-source platform for managing containerized workloads and services that facilitate declarative configuration and automation. Kubernetes has a vast and rapidly growing ecosystem, and the services, support, and tools of Kubernetes are widely available.

In one embodiment, a target resource (DeamonSet) is deployed in the edge proxy device, and the target resource is used for associating a preset label for the edge proxy device. In one embodiment, the preset label can be, for example, tencent.cr/ec-role: ec-kafka-proxy. When another device in the physical edge zone is added with the preset label, the other device added with the preset label is used as the edge proxy device. Based on the target resource deployed in the edge proxy device, the kafka log proxy component in the edge cluster will be automatically deployed to the edge proxy device deployed with the target resource, and the edge server associated with the edge proxy device will also be automatically prepared to accept the scheduling service positioned in the central cluster, thus simplifying the construction and maintenance of the edge point (including the edge server and associated edge proxy device) so that the edge point can be automatically discovered and access the central cluster.

Figure 5C:
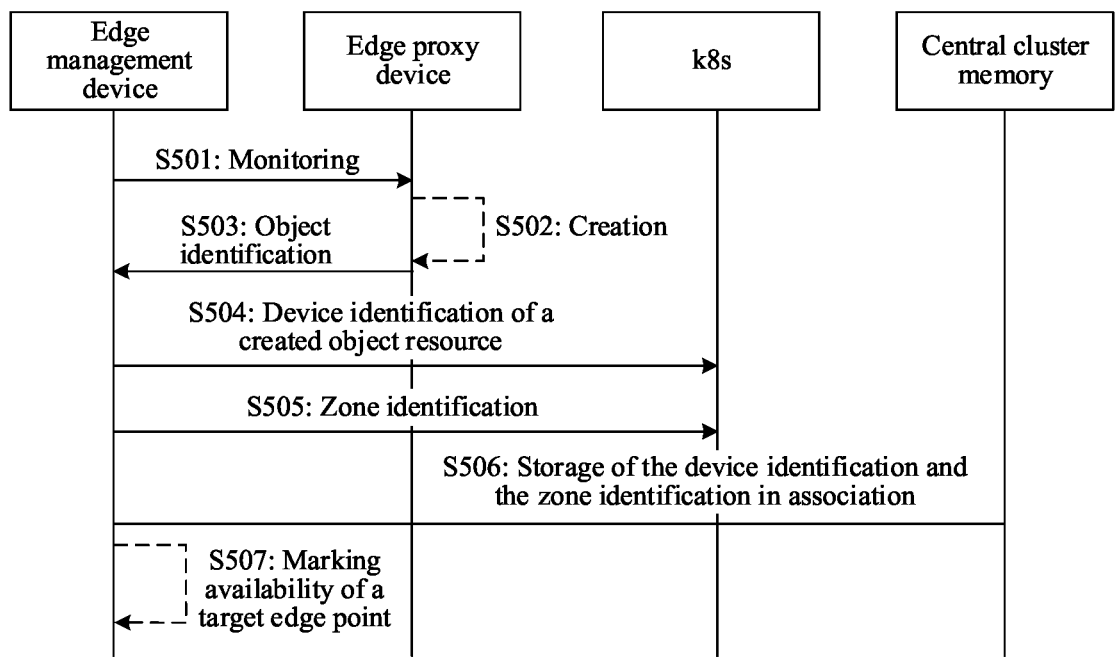
FIG. 5c is a schematic diagram of an automatic discovery flow of an edge point according to an embodiment of this application.

Next, with reference to FIG. 5c, an automatic discovery flow of a target edge point is described with an example where a target edge server and an edge proxy device associated with the target edge server form the target edge point.

Step S501: The edge management device monitors the edge proxy device.

In one embodiment, the first communication channel and the second communication channel described above are both established after the target edge point is marked as available, and the target edge point is marked as available by an edge management device. Therefore, when the edge management device marks the target edge point as available, the resource object creation information of an edge proxy device of the target edge point may be first acquired by the edge management device.

Step S502: The edge proxy device creates a resource object.

In one embodiment, the resource object pod created by the edge proxy device is one or more sets of containers.

Step S503: The edge management device acquires an object identification.

In the embodiment of this application, after the edge management device determines, based on the resource object creation information, that the edge proxy device creates the resource object (pod), a device identification of the edge proxy device and a zone identification of a physical edge zone where the edge proxy device is positioned are acquired.

Step S504: The edge management device transmits the device identification of the created object resource to the container operation platform k8s.

Step S505: The edge management device transmits the zone identification to k8s.

Step S506: The edge management device stores the device identification and the zone identification in association in the central cluster.

Step S507: The edge management device marks availability of the target edge point.

In one embodiment, since the resource object pod created by the edge proxy device is one or more sets of containers, the edge management device may mark the target edge point as available after the device identification and the zone identification are stored in association in the central cluster. The network type of the edge proxy device is a host network type (i.e., host network), and the device identification (i.e., node IP) of the edge proxy device configured as the host network type is consistent with an object identification of the resource object created in the edge proxy device configured as the host network type. When acquiring the device identification of the edge proxy device, the edge management device may acquire the object identification (i.e., pod IP) of the resource object created in the edge proxy device, and use the acquired object identification as the device identification of the edge proxy device. Therefore, the zone identification acquired by the edge management device is also the physical region (or physical edge zone) range of the terminal device corresponding to the client supported by the corresponding edge server. After the edge management device stores the device identification and the zone identification in association, the discovery process of the newly added edge point (such as the target edge points above) is completed.

In one embodiment, the target edge point is deleted by the edge management device. Therefore, when the edge management device acquires a deletion trigger instruction for the target edge point, the edge management device may stop running the edge proxy device and delete the device identification and the zone identification stored in association in the central cluster. After the device identification and the zone identification are deleted, the target edge point is unavailable. In one embodiment, the target cloud application is run in edge servers included in different edge points, one edge point corresponding to one physical edge zone. An edge server of any edge point outputs and displays, based on a zone identification of a corresponding physical edge zone, an application picture of the target cloud application to a client positioned in the physical edge zone.

S404: Acquire feedback data generated in response to the second-type data from the central cluster via the second communication channel.

S405: Update the application picture using the feedback data, and display the updated application picture in the client of the target cloud application.

In step S404 and step S405, the multiple services provided by the central cluster include at least a running analysis service and a basic instruction service, where the first-type data is data supporting analysis of a running condition of the target cloud application, and the second-type data is basic instruction data for the target cloud application. In response to the first-type data being the data supporting analysis of the running condition of the target cloud application, the service matching the first-type data is the running analysis service; and in response to the second-type data being the basic instruction data, the service matching the second-type data is the basic instruction service. After the target edge server transmits the first-type data to the central cluster via the first communication channel and the central cluster analyzes the running condition of the target cloud application with the running analysis service, the target edge server can also acquire the analysis result for the target cloud application via the first communication channel, and outputs and displays the acquired analysis result to the quality supervision device. Alternatively, the quality supervision device for the target cloud application may directly access the central cluster, and acquire the analysis result for the target cloud application from the central cluster.

In one embodiment, the second-type data with a high real-time requirement which is transmitted by the target edge server to the central cluster via the second communication channel is acquired by the target edge server after displaying the application picture of the target cloud application in the client. Therefore, after the target edge server transmits the second-type data to the central cluster via the second communication channel and the central cluster responds to the second-type data with the basic instruction service, the target edge server acquires feedback data generated in response to the second-type data from the central cluster via the second communication channel. In implementation, the target edge server may acquire feedback data from the edge management device of the central cluster through a proxy container in the target edge server.

After the target edge server acquires the feedback data for the second-type data, the application picture can be updated using the feedback data, and the updated application picture is displayed in the client. In one embodiment, the target edge server can transmit the feedback data to a running container in the target edge server so as to update the application picture using the feedback data in the running container. The updated application picture is encoded in the running container and then transmitted to the client through the transmission container in the target edge server, and the updated application picture is displayed in the client. That is, when a central cluster and edge points (including edge servers and associated edge proxy devices) in a cloud processing system are deployed, public services in the central cluster can be centrally managed, e.g., centrally deployed in an Internet data center (IDC), and the edge points can be deployed in computer rooms in regions physically close to operation objects. For example, a central cluster in South China can be deployed in an IDC in Shenzhen, while the edge points can be separately deployed in Huizhou and Dongguan so as to provide high-quality and smooth cloud application access experience specifically for users in Huizhou and Dongguan. It is to be understood that edge points are to be deployed as lightweight as possible. Only outflow nodes supporting running of outflow instances are included in the edge points, and other services will be attached to the central cluster, so as to reduce construction and maintenance costs of the edge points. The outflow node will also be deployed in the central cluster so as to enable operation objects covered by the central cluster to access the cloud application through the central cluster.

Figure 5D:
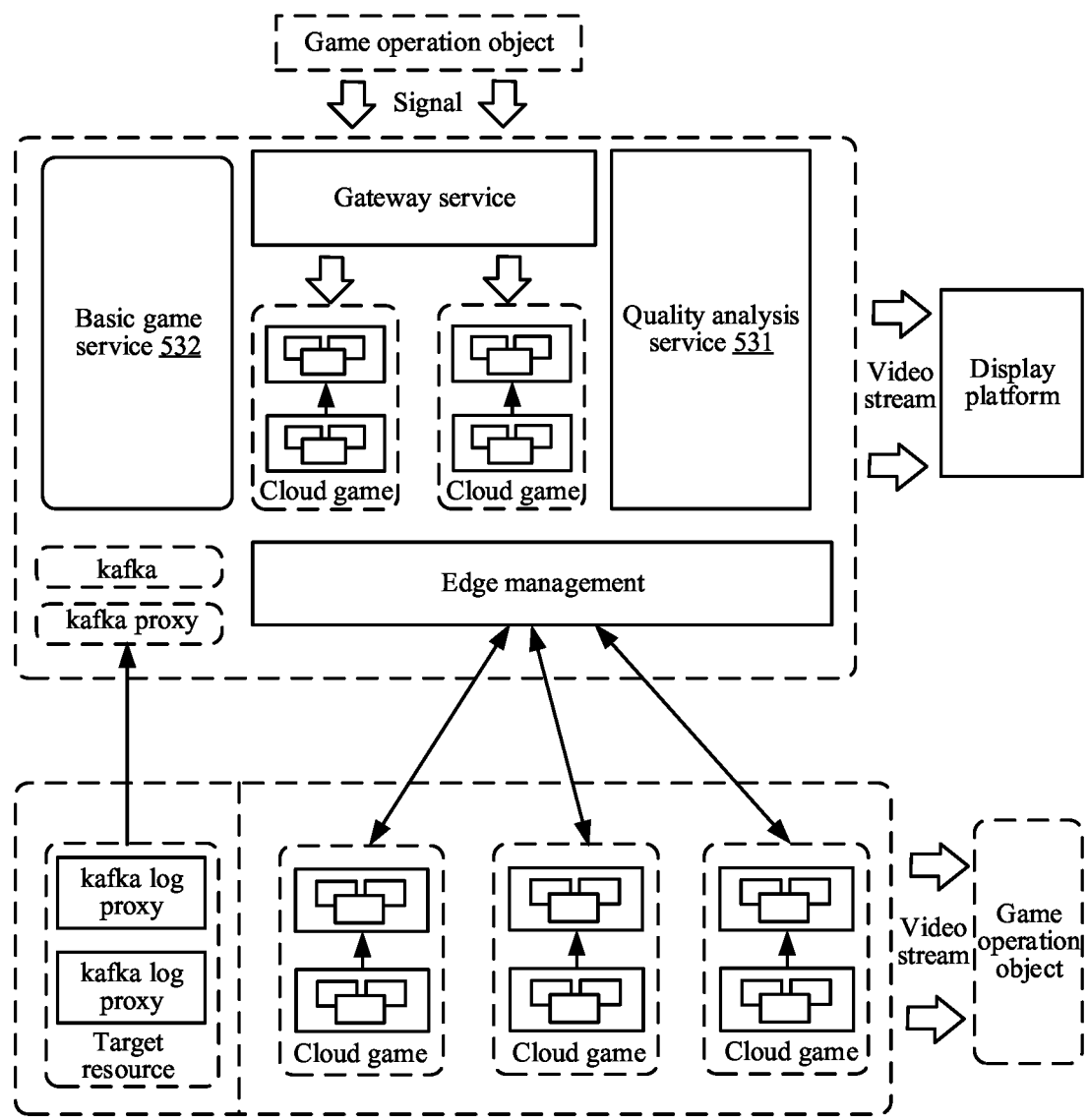
FIG. 5d is a schematic diagram of a processing flow of a target cloud game according to an embodiment of this application.

In one embodiment, the target cloud application includes a target cloud game, and the client of the target cloud application includes a game client corresponding to the target cloud game. The first-type data supporting analysis of the running condition of the target cloud application includes log data of the target cloud game, and the basic instruction data for the target cloud application includes a basic game instruction including any one or more of the following: a storage instruction, an authentication instruction, etc. The running process of the target cloud game will now be described in conjunction with FIG. 5*d*.

The cloud game runs based on a cloud game processing system (i.e., the cloud processing system above) which includes a central cluster and a plurality of edge servers sharing a quality analysis service 531 and a basic game service 532 provided by the central cluster. The target cloud game accesses, based on the distances with edge servers, an edge server with the shortest corresponding distance as a target edge server. The target edge server can establish a connection with the game client through a transmission container included in a game instance of the target cloud game, and trigger running of the target cloud game in the game container. In the process of running the target game in the game container, the game container continuously transmits an AV stream to the game client through the transmission container, and displays a corresponding game picture in the game client. In addition, after summary data generated by the transmission container transmitting the AV stream to the game client (or log data generated by running the cloud game) is collected by the target edge server, the summary data is transmitted to the central cluster through edge proxy device associated with the target edge server and the central proxy device in the central cluster, so as to perform quality analysis of the running process of the target cloud game.

When the game container of the target edge server runs the target cloud game, a game operation user can transmit a basic game instruction through the terminal device where the game client is positioned, and the basic game instruction can be transmitted to the central cluster via a long connection between the target edge server and the edge management device in the central cluster. Feedback data for the basic game instruction can be acquired from the edge management device, where the feedback data can update the currently displayed game picture in the game container. The updated game picture is sent by the game container to the game client through the transmission container for display.

In addition, the target cloud game processing system further includes a virtual gamepad gateway (gamepad GW). The virtual gamepad GW is provided so that when there is no physical gamepad, the game operation object can use the terminal device as a physical carrier for accessing the gamepad. A touch-screen gamepad is generated on the terminal screen. In addition, the central cluster may further provide an interface for live access, so that the game can be broadcast directly on a live broadcast platform based on the central cluster in the process of the cloud game.

In the embodiment of this application, when the target cloud application runs in the cloud processing system, the running is performed by a running container of a target edge server closest to the client corresponding to the target cloud application. The target edge server shares multiple services provided by the central cluster with a plurality of other edge servers, thus ensuring the lightweight deployment of the edge server, and improving resource utilization in the central cluster based on sharing and reuse of services in the central cluster. After acquiring the running data for the target cloud application, the target edge server transmits, in response to the running data being first-type data, the first-type data to the central cluster for response via a first communication channel, and transmits, in response to the running data being second-type data, the second-type data to the central cluster for response via a second communication channel. Then feedback data for the running data can be acquired via the corresponding communication channel. Since automatic discovery of edge points in the cloud processing system can be realized in the deployment of the edge points, the deployment progress of edge points and the efficiency of edge point discovery can be improved. Based on the separation of data transmission channels, data security of the cloud application can be effectively improved and the operation fluency of the cloud application can be improved.

Figure 6:
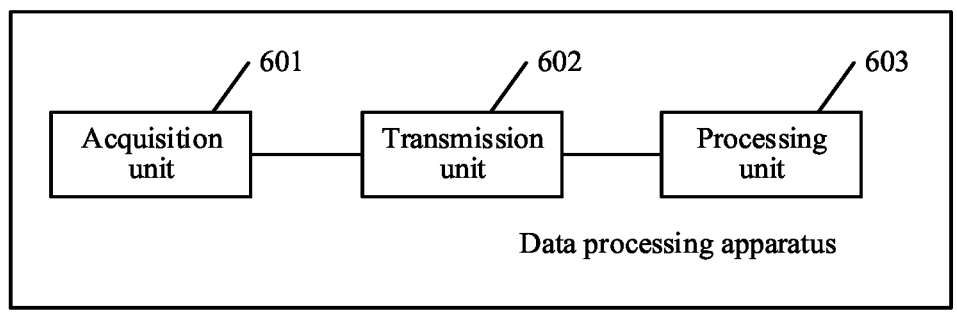
FIG. 6 is a schematic block diagram of a data processing apparatus according to an embodiment of this application.

Based on the description of the embodiment of the data processing method above, an embodiment of this application further provides a data processing apparatus applied to a cloud processing system, the cloud processing system including a central cluster and a plurality of edge servers sharing multiple services provided by the central cluster. The data processing apparatus may be a computer program (including program codes) running in the target edge server above including any one of the plurality of edge servers that is physically closest to a client of a target cloud application. The data processing apparatus may be configured to perform the data processing method described in FIG. 2 and FIG. 4. With reference to FIG. 6, the data processing apparatus includes: an acquisition unit 601 and a transmission unit 602.

The acquisition unit 601 is configured to acquire running data of the target cloud application.

The transmission unit 602 is configured to transmit the running data to the central cluster via a first communication channel between the target edge server and the central cluster in response to the running data being first-type data, so that the central cluster responds to the first-type data with a service matching the first-type data, the first communication channel being a channel matching a real-time requirement of the first-type data.

The transmission unit 602 is further configured to transmit the running data to the central cluster via a second communication channel in response to the running data being second-type data, so that the central cluster responds to the second-type data with a service matching the second-type data, the second communication channel being a channel matching a real-time requirement of the second-type data, and the real-time requirements of the first-type data and the second-type data being different.

In one embodiment, the central cluster includes a central proxy device and an edge management device, and the target edge server is associated with an edge proxy device. When the real-time requirement of the first-type data is lower than the real-time requirement of the second-type data, a communication channel between the edge proxy device and the central proxy device is the first communication channel; and a communication channel between the target edge server and the edge management device is the second communication channel.

In one embodiment, the target edge server includes a running container, a transmission container, and a proxy container; the target cloud application runs in the running container of the target edge server, and the transmission container is used for establishing connections with the client and the running container, separately, so as to encode an application picture of the target cloud application generated by the running container and transmit the encoded application picture to the client for display; the proxy container is used for establishing communication connections for the transmission container and the running container, and establishing a communication connection with an edge management device in the central cluster, where the second communication channel is a communication channel obtained upon establishing the communication connection between the proxy container and the edge management device.

In one embodiment, when the running data is acquired by the proxy container of the target edge server, the running data is the second-type data. The transmission unit 602 is configured to: transmit the running data to the edge management device in the central cluster via the communication connection between the proxy container and the edge management device in the central cluster in response to the running data being the second-type data.

In one embodiment, the multiple services provided by the central cluster include at least a running analysis service and a basic instruction service, where the first-type data is data supporting analysis of a running condition of the target cloud application, and the second-type data is basic instruction data for the target cloud application. In response to the first-type data being the data supporting analysis of the running condition of the target cloud application, the service matching the first-type data is the running analysis service; and in response to the second-type data being the basic instruction data, the service matching the second-type data is the basic instruction service.

In one embodiment, the basic instruction data is acquired by displaying the application picture of the target cloud application in the client of the target cloud application. The apparatus further includes a processing unit 603.

The acquisition unit 601 is further configured to acquire feedback data generated in response to the second-type data from the central cluster via the second communication channel.

The processing unit 603 is configured to update the application picture using the feedback data, and transmit the updated application picture to the client of the target cloud application so as to display the updated application picture in the client of the target cloud application.

In one embodiment, the acquisition unit 601 is further configured to: acquire the feedback data from an edge management device of the central cluster through a proxy container in the target edge server.

The processing unit 603 is further configured to: transmit the feedback data to a running container in the target edge server so as to update the application picture using the feedback data in the running container; and transmit the updated application picture that is encoded in the running container to the client of the target cloud application through a transmission container in the target edge server and display the updated application picture in the client of the target cloud application.

In one embodiment, the target cloud application includes a target cloud game, and the client of the target cloud application includes a game client corresponding to the target cloud game. The first-type data supporting analysis of the running condition of the target cloud application includes log data of the target cloud game, and the basic instruction data for the target cloud application includes a basic game instruction including at least one of: a storage instruction and an authentication instruction.

In one embodiment, the target edge server and an edge proxy device associated with the target edge server form a target edge point, and the first communication channel and the second communication channel are both established after the target edge point is marked as available. The target edge point is marked as available by an edge management device, and the method for marking the target edge point as available by the edge management device includes: acquiring, by the edge management device, resource object creation information of the edge proxy device associated with the target edge point, and acquiring, by the edge management device, a device identification of the edge proxy device and a zone identification of a physical edge zone where the edge proxy device is positioned after determining, based on the resource object creation information, that the edge proxy device has created a resource object; and marking the target edge point as available after the device identification and the zone identification are stored in association in the central cluster.

In one embodiment, the network type of the edge proxy device is a host network type, and the device identification of the edge proxy device configured as the host network type is consistent with an object identification of the resource object created in the edge proxy device configured as the host network type. The acquiring a device identification of the edge proxy device includes acquiring the object identification of the resource object created in the edge proxy device, and using the acquired object identification as the device identification of the edge proxy device.

In one embodiment, a target resource is deployed in the edge proxy device, and the target resource is used for associating a preset label for the edge proxy device. In response to another device in the physical edge zone being added with the preset label, the other device added with the preset label is used as the edge proxy device.

In one embodiment, the target edge point is deleted by the edge management device, and the method for deleting the target edge point by the edge management device includes: in response to acquiring a deletion trigger instruction for the target edge point, the edge management device stopping running the edge proxy device and deleting the device identification and the zone identification stored in association in the central cluster. After the device identification and the zone identification are deleted, the target edge point is unavailable.

In one embodiment, the target cloud application is run in edge servers included in different edge points, one edge point corresponding to one physical edge zone. An edge server of any edge point outputs and displays, based on a zone identification of a corresponding physical edge zone, an application picture of the target cloud application to a client positioned in the physical edge zone.

In the embodiments of this application, based on the centralized management by the cloud processing system on the central cluster providing public services, any edge server in the cloud processing system can share and reuse public services by invoking corresponding service components in the central cluster, so that repeated deployment of common components can be avoided and resource utilization of the central cluster can be improved. The communication channels between the edge server and the central cluster in the cloud processing system include a first communication channel and a second communication channel. After the acquisition unit 601 acquires the running data of the target cloud application, the transmission unit 602 can transmit the running data to the central cluster via the first communication channel if the running data is determined to be first-type data, and the central cluster responds to the first-type data by invoking a corresponding service; and if the running data for the target cloud application acquired by the acquisition unit 601 is second-type data, the transmission unit 602 can transmit the second-type data to the center cluster via the second communication channel with the center cluster, and the central cluster responds to the second-type data by invoking a corresponding service. The public services provided in the center cluster are invoked via different communication channels, i.e., different business interactions and data transmissions with the center cluster are implemented based on different communication channels. Therefore, when the public services in the center cluster are invoked based on different businesses, the data paths for the data of the different businesses are independent from each other and do not affect each other, thus enabling concurrent execution of the different businesses, and improving security of transmission of business data. In this application, the term "unit" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit can be implemented using one or more processors (or processors and memory). Likewise, a processor (or processors and memory) can be used to implement one or more units.

Figure 7:
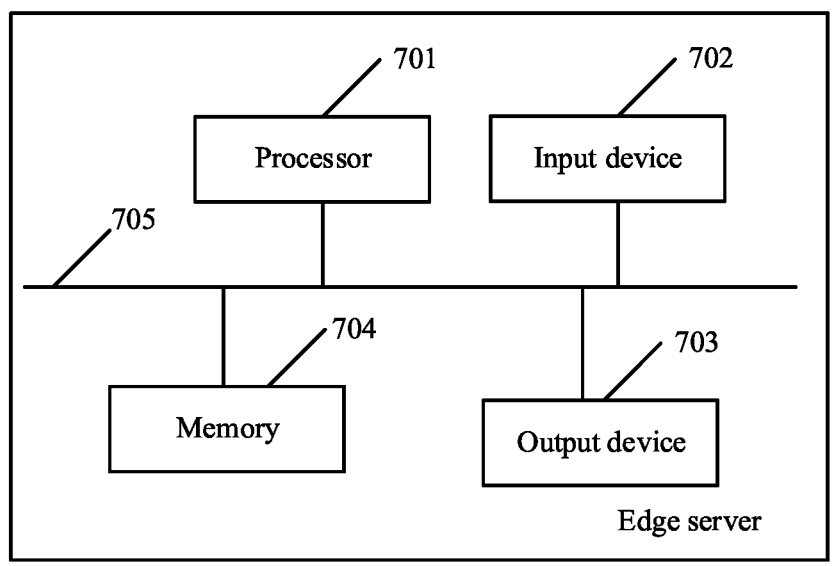
FIG. 7 is a schematic block diagram of an edge server according to an embodiment of this application.

Reference is made to FIG. 7, which is a schematic block diagram of a structure of an edge server (such as the target edge server described above) according to an embodiment of this application. The target edge server shares multiple services provided by the central cluster included in the data processing system with a plurality of other edge servers, and the target edge server is any edge server that is physically closest to the client of the target cloud application. As shown in FIG. 7, the edge server in this embodiment may include: one or more processors 701; and one or more input devices 702, one or more output devices 703, and a memory 704. The processor 701, the input device 702, the output device 703, and the memory 704 described above are connected via a bus 705. The memory 704 is configured to store a computer program including program instructions, and the processor 701 is configured to execute the program instructions stored in the memory 704.

The memory 704 may include a volatile memory, such as random-access memory (RAM). The memory 704 may include non-volatile memory as well, such as flash memory, solid-state drive (SSD), etc. The memory 704 may also include a combination of memories of the types described above.

The processor 701 may be a CPU. The processor 701 may further include a hardware chip. The hardware chip may be an application-specific integrated circuit (ASIC), a programmable logic device (PLD), etc. The PLD may be a field-programmable gate array (FPGA), a generic array logic (GAL), etc. The processor 701 may also be a combination of the structures above.

In the embodiments of this application, the memory 704 is configured to store a computer program including program instructions, and the processor 701 is configured to execute the program instructions stored in the memory 704 for implementing the steps of the corresponding method as described above in FIG. 2 and FIG. 4.

In one embodiment, the processor 701 is configured to invoke the program instructions for: acquiring running data of the target cloud application; transmitting the running data to the central cluster via a first communication channel between the target edge server and the central cluster in response to the running data being first-type data, so that the central cluster responds to the first-type data with a service matching the first-type data, the first communication channel being a channel matching a real-time requirement of the first-type data; and transmitting the running data to the central cluster via a second communication channel in response to the running data being second-type data, so that the central cluster responds to the second-type data with a service matching the second-type data, the second communication channel being a channel matching a real-time requirement of the second-type data, and the real-time requirements of the first-type data and the second-type data being different.

In one embodiment, the central cluster includes a central proxy device and an edge management device, and the target edge server is associated with an edge proxy device. When the real-time requirement of the first-type data is lower than the real-time requirement of the second-type data, a communication channel between the edge proxy device and the central proxy device is the first communication channel; and a communication channel between the target edge server and the edge management device is the second communication channel.

In one embodiment, the target edge server includes a running container, a transmission container, and a proxy container; the target cloud application runs in the running container of the target edge server, and the transmission container is used for establishing connections with the client and the running container, separately, so as to encode an application picture of the target cloud application generated by the running container and transmit the encoded application picture to the client for display; the proxy container is used for establishing communication connections for the transmission container and the running container, and establishing a communication connection with an edge management device in the central cluster, where the second communication channel is a communication channel obtained upon establishing the communication connection between the proxy container and the edge management device.

In one embodiment, when the running data is acquired by the proxy container of the target edge server, the running data is the second-type data. The processor 701 is configured to invoke the program instructions for: transmitting the running data to the edge management device in the central cluster via the communication connection between the proxy container and the edge management device in the central cluster in response to the running data being the second-type data.

In one embodiment, the multiple services provided by the central cluster include at least a running analysis service and a basic instruction service, where the first-type data is data supporting analysis of a running condition of the target cloud application, and the second-type data is basic instruction data for the target cloud application. In response to the first-type data being the data supporting analysis of the running condition of the target cloud application, the service matching the first-type data is the running analysis service; and in response to the second-type data being the basic instruction data, the service matching the second-type data is the basic instruction service.

In one embodiment, the basic instruction data is acquired by displaying the application picture of the target cloud application in the client of the target cloud application. The processor 701 is configured to invoke the program instructions for: acquiring feedback data generated in response to the second-type data from the central cluster via the second communication channel, and updating the application picture using the feedback data, and transmitting the updated application picture to the client of the target cloud application so as to display the updated application picture in the client of the target cloud application.

In one embodiment, the processor 701 is configured to invoke the program instructions for: acquiring the feedback data from an edge management device of the central cluster through a proxy container in the target edge server.

The processor 701 is configured to invoke the program instructions for: transmitting the feedback data to a running container in the target edge server so as to update the application picture using the feedback data in the running container; and transmitting the updated application picture that is encoded in the running container to the client of the target cloud application through a transmission container in the target edge server and displaying the updated application picture in the client of the target cloud application.

In one embodiment, the target cloud application includes a target cloud game, and the client of the target cloud application includes a game client corresponding to the target cloud game.

The first-type data supporting analysis of the running condition of the target cloud application includes log data of the target cloud game, and the basic instruction data for the target cloud application includes a basic game instruction including at least one of: a storage instruction and an authentication instruction.

In one embodiment, the target edge server and an edge proxy device associated with the target edge server form a target edge point, and the first communication channel and the second communication channel are both established after the target edge point is marked as available. The target edge point is marked as available by an edge management device, and the processor 701 is configured to invoke the program instructions for: acquiring, by the edge management device, resource object creation information of the edge proxy device associated with the target edge point, and acquiring, by the edge management device, a device identification of the edge proxy device and a zone identification of a physical edge zone where the edge proxy device is positioned after determining, based on the resource object creation information, that the edge proxy device has created a resource object; and marking the target edge point as available after the device identification and the zone identification are stored in association in the central cluster.

In one embodiment, the network type of the edge proxy device is a host network type, and the device identification of the edge proxy device configured as the host network type is consistent with an object identification of the resource object created in the edge proxy device configured as the host network type. The processor 701 is configured to invoke the program instructions for: acquiring the object identification of the resource object created in the edge proxy device, and using the acquired object identification as the device identification of the edge proxy device.

In one embodiment, a target resource is deployed in the edge proxy device, and the target resource is used for associating a preset label for the edge proxy device. In response to another device in the physical edge zone being added with the preset label, the other device added with the preset label is used as the edge proxy device.

In one embodiment, the target edge point is deleted by the edge management device, and the processor 701 is configured to invoke the program instructions for: in response to acquiring a deletion trigger instruction for the target edge point, the edge management device stopping running the edge proxy device and deleting the device identification and the zone identification stored in association in the central cluster. After the device identification and the zone identification are deleted, the target edge point is unavailable.

In one embodiment, the target cloud application is run in edge servers included in different edge points, one edge point corresponding to one physical edge zone. An edge server of any edge point outputs and displays, based on a zone identification of a corresponding physical edge zone, an application picture of the target cloud application to a client positioned in the physical edge zone.

An embodiment of this application provides a computer program product or computer program including computer instructions stored in a computer-readable storage medium. A processor of a computer device reads the computer instructions from the computer-readable storage medium, and the processor executes the computer instructions to cause the computer device to perform the embodiment of the method as shown in FIG. 2 or FIG. 4 above. The computer-readable storage medium may be a magnetic disk, an optical disc, a read-only memory (ROM), a random access memory (RAM), etc.

The above disclosures are merely some embodiments of this application, and are not intended to limit the claim scope of this application. A person of ordinary skill in the art may understand and implement all or some processes of the foregoing embodiments, and equivalent modifications made according to the claims of this application shall still fall within the scope of the present disclosure.

What is claimed is:

1. A method applied to a cloud processing system, the cloud processing system comprising a central cluster and a target edge server sharing multiple services provided by the central cluster with other edge servers, wherein the target edge server is physically closest to a client of a target cloud application, the method being performed by the target edge server and comprising:

acquiring running data of the target cloud application from the client;

transmitting the running data to the central cluster via a first communication channel between the target edge server and the central cluster in response to the running data being first-type data, the first communication channel being a channel matching a real-time requirement of the first-type data; and transmitting the running data to the central cluster via a second communication channel in response to the running data being second-type data, the second communication channel being a channel matching a real-time requirement of the second-type data that is different from that of the real-time requirement of the first-type data, wherein the target edge server and an edge proxy device associated with the target edge server form a target edge point, and the first communication channel and the second communication channel are both established after the target edge point is marked as available; and the target edge point is marked as available by an edge management device by:

acquiring, by the edge management device, resource object creation information of the edge proxy device associated with the target edge server;

acquiring, by the edge management device, a device identification of the edge proxy device and a zone identification of a physical edge zone where the edge proxy device is positioned after determining, based on the resource object creation information, that the edge proxy device has created a resource object; and marking the target edge point as available after the device identification and the zone identification are stored in association in the central cluster.

2. The method according to claim 1, wherein the central cluster comprises a central proxy device and an edge management device, and the target edge server is associated with an edge proxy device;

when the real-time requirement of the first-type data is lower than the real-time requirement of the second-type data, a communication channel between the edge proxy device and the central proxy device is the first communication channel; and a communication channel between the target edge server and the edge management device is the second communication channel.

3. The method according to claim 1, wherein the target edge server comprises a running container, a transmission container, and a proxy container;

the target cloud application runs in the running container of the target edge server, and the transmission container is used for establishing connections with the client and the running container, separately and transmitting encoded application picture generated by the target cloud application to the client for display; and the proxy container is used for establishing communication connections for the transmission container and the running container, and establishing a communication connection with an edge management device in the central cluster, wherein the second communication channel is a communication channel obtained upon establishing the communication connection between the proxy container and the edge management device.

4. The method according to claim 1, wherein the multiple services provided by the central cluster comprise at least a running analysis service and a basic instruction service, wherein the service matching the first-type data is the running analysis service and the first-type data is data supporting analysis of a running condition of the target cloud application, the service matching the second-type data is the basic instruction service and the second-type data is basic instruction data for the target cloud application.

5. The method according to claim 1, wherein the network type of the edge proxy device is a host network type, and the device identification of the edge proxy device configured as the host network type is consistent with an object identification of the resource object created in the edge proxy device configured as the host network type; and the acquiring a device identification of the edge proxy device comprises:

acquiring the object identification of the resource object created in the edge proxy device, and using the acquired object identification as the device identification of the edge proxy device.

6. An edge server comprising a processor, an input device, an output device, and a memory, the processor, the input device, the output device, and the memory being in communication connection with each other, the memory being configured to store program instructions, and the processor being configured to invoke the program instructions to perform a method applied to a cloud processing system comprising a central cluster and the edge server accessing multiple services provided by the central cluster, the method comprising:

acquiring running data of the target cloud application from a client of a target cloud application that is physically closest to the edge server;

transmitting the running data to the central cluster via a first communication channel between the target edge server and the central cluster in response to the running data being first-type data, the first communication channel being a channel matching a real-time requirement of the first-type data; and transmitting the running data to the central cluster via a second communication channel in response to the running data being second-type data, the second communication channel being a channel matching a real-time requirement of the second-type data that is different from that of the real-time requirement of the first-type data, wherein the target edge server and an edge proxy device associated with the target edge server form a target edge point, and the first communication channel and the second communication channel are both established after the target edge point is marked as available; and the target edge point is marked as available by an edge management device by:

acquiring, by the edge management device, resource object creation information of the edge proxy device associated with the target edge server; and acquiring, by the edge management device, a device identification of the edge proxy device and a zone identification of a physical edge zone where the edge proxy device is positioned after determining, based on the resource object creation information, that the edge proxy device has created a resource object; and marking the target edge point as available after the device identification and the zone identification are stored in association in the central cluster.

7. The edge server according to claim 6, wherein the central cluster comprises a central proxy device and an edge management device, and the target edge server is associated with an edge proxy device;

when the real-time requirement of the first-type data is lower than the real-time requirement of the second-type data, a communication channel between the edge proxy device and the central proxy device is the first communication channel; and a communication channel between the target edge server and the edge management device is the second communication channel.

8. The edge server according to claim 6, wherein the target edge server comprises a running container, a transmission container, and a proxy container;

the target cloud application runs in the running container of the target edge server, and the transmission container is used for establishing connections with the client and the running container, separately and transmitting encoded application picture generated by the target cloud application to the client for display; and the proxy container is used for establishing communication connections for the transmission container and the running container, and establishing a communication connection with an edge management device in the central cluster, wherein the second communication channel is a communication channel obtained upon establishing the communication connection between the proxy container and the edge management device.

9. The edge server according to claim 6, wherein the multiple services provided by the central cluster comprise at least a running analysis service and a basic instruction service, wherein the service matching the first-type data is the running analysis service and the first-type data is data supporting analysis of a running condition of the target cloud application, the service matching the second-type data is the basic instruction service and the second-type data is basic instruction data for the target cloud application.

10. The edge server according to claim 6, wherein the network type of the edge proxy device is a host network type, and the device identification of the edge proxy device configured as the host network type is consistent with an object identification of the resource object created in the edge proxy device configured as the host network type; and the acquiring a device identification of the edge proxy device comprises:

acquiring the object identification of the resource object created in the edge proxy device, and using the acquired object identification as the device identification of the edge proxy device.

11. A non-transitory computer-readable storage medium storing program instructions that, when executed by a processor of an edge server, cause the edge server to perform a method applied to a cloud processing system comprising a central cluster and the edge server accessing multiple services provided by the central cluster, the method comprising:

acquiring running data of the target cloud application from a client of a target cloud application that is physically closest to the edge server;

transmitting the running data to the central cluster via a first communication channel between the target edge server and the central cluster in response to the running data being first-type data, the first communication channel being a channel matching a real-time requirement of the first-type data; and transmitting the running data to the central cluster via a second communication channel in response to the running data being second-type data, the second communication channel being a channel matching a real-time requirement of the second-type data that is different from that of the real-time requirement of the first-type data, wherein the target edge server and an edge proxy device associated with the target edge server form a target edge point, and the first communication channel and the second communication channel are both established after the target edge point is marked as available; and the target edge point is marked as available by an edge management device by:

acquiring, by the edge management device, resource object creation information of the edge proxy device associated with the target edge server; and acquiring, by the edge management device, a device identification of the edge proxy device and a zone identification of a physical edge zone where the edge proxy device is positioned after determining, based on the resource object creation information, that the edge proxy device has created a resource object; and marking the target edge point as available after the device identification and the zone identification are stored in association in the central cluster.

12. The non-transitory computer-readable storage medium according to claim 11, wherein the central cluster comprises a central proxy device and an edge management device, and the target edge server is associated with an edge proxy device;

when the real-time requirement of the first-type data is lower than the real-time requirement of the second-type data, a communication channel between the edge proxy device and the central proxy device is the first communication channel; and a communication channel between the target edge server and the edge management device is the second communication channel.

13. The non-transitory computer-readable storage medium according to claim 11, wherein the target edge server comprises a running container, a transmission container, and a proxy container;

the target cloud application runs in the running container of the target edge server, and the transmission container is used for establishing connections with the client and the running container, separately and transmitting encoded application picture generated by the target cloud application to the client for display; and the proxy container is used for establishing communication connections for the transmission container and the running container, and establishing a communication connection with an edge management device in the central cluster, wherein the second communication channel is a communication channel obtained upon establishing the communication connection between the proxy container and the edge management device.

14. The non-transitory computer-readable storage medium according to claim 11, wherein the multiple services provided by the central cluster comprise at least a running analysis service and a basic instruction service, wherein the service matching the first-type data is the running analysis service and the first-type data is data supporting analysis of a running condition of the target cloud application, the service matching the second-type data is the basic instruction service and the second-type data is basic instruction data for the target cloud application.

* * * * *